United States Patent
Nolcheff et al.

(10) Patent No.: US 10,876,409 B2
(45) Date of Patent: Dec. 29, 2020

(54) MISTUNED ROTORS AND METHODS FOR MANUFACTURE

(71) Applicant: HONEYWELL INTERNATIONAL INC., Morris Plains, NJ (US)

(72) Inventors: Nick Nolcheff, Chandler, AZ (US); John Repp, Gilbert, AZ (US); John A. Gunaraj, Chandler, AZ (US); Yoseph Gebre-Giorgis, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 91 days.

(21) Appl. No.: 16/183,448

(22) Filed: Nov. 7, 2018

(65) Prior Publication Data

US 2020/0141242 A1    May 7, 2020

(51) Int. Cl.
   *F01D 5/10* (2006.01)
   *B23P 15/04* (2006.01)
   *F01D 5/16* (2006.01)

(52) U.S. Cl.
   CPC ............. *F01D 5/10* (2013.01); *B23P 15/04* (2013.01); *F01D 5/16* (2013.01); *B23P 2700/01* (2013.01); *B23P 2700/50* (2013.01); *F05D 2260/961* (2013.01)

(58) Field of Classification Search
   CPC .............................. F01D 5/10; F05D 2260/961
   See application file for complete search history.

(56) References Cited

U.S. PATENT DOCUMENTS

| | | | | |
|---|---|---|---|---|
| 8,043,063 | B2* | 10/2011 | Kelly | F01D 5/10 |
| | | | | 415/119 |
| 9,097,125 | B2* | 8/2015 | Ghorbani Zarimahalleh | |
| | | | | F04D 29/666 |
| 10,215,194 | B2* | 2/2019 | Theratil | F01D 5/16 |
| 2002/0064458 | A1 | 5/2002 | Montgomery et al. | |
| 2014/0050590 | A1 | 2/2014 | Ghorbani Zarimahalleh et al. | |
| 2017/0175776 | A1 | 6/2017 | Theratil et al. | |

FOREIGN PATENT DOCUMENTS

CN       102799730 A    11/2012

OTHER PUBLICATIONS

Micheli, Marco, et al., "Compressor Design from Specification to Validation—Application of a Fast and Reliable Process," Proceedings of ASME Turbo Expo 2009: Power for Land, Sea and Air, GT2009-59217, Jun. 8-12, 2009.

* cited by examiner

*Primary Examiner* — Igor Kershteyn
*Assistant Examiner* — Juan G Flores
(74) *Attorney, Agent, or Firm* — Lorenz & Kopf, LLP

(57) ABSTRACT

A rotor includes a plurality of airfoils and each airfoil has a span that extends from 0% at a root to 100% at a tip, a chord that extends from 0% at a leading edge to 100% at a trailing edge and a pressure side opposite a suction side. The pressure side of each airfoil has a pressure side surface shape and the suction side of each airfoil has a suction side surface shape based on an operating state of the rotor. Each airfoil has the same suction side surface shape between 10% and 90% of the chord and between 80% and 100% of the span at a first state. At least one first airfoil has a different suction side surface shape between 10% and 90% of the chord and between 80% and 100% of the span than at least one second airfoil at a static state of the rotor.

19 Claims, 18 Drawing Sheets

MISTUNED ROTORS AND METHODS FOR MANUFACTURE

TECHNICAL FIELD

The present disclosure generally relates to gas turbine engines, and more particularly relates to mistuned rotors and methods for manufacture of a mistuned rotor for a gas turbine engine.

BACKGROUND

Gas turbine engines may be employed to power various devices. For example, a gas turbine engine may be employed to power a mobile platform, such as an aircraft. Generally, gas turbine engines include one or more fans or compressors, which operate to draw air into the gas turbine engine and to raise a pressure of that air. Each of the fans and compressors has one or more airfoils coupled to a rotor that is rotatable to accomplish this task. During the operation of the fans and compressors, due to a natural vibratory frequency of the airfoils, the fans and compressors may experience aerodynamic instability, or flutter. Flutter of the airfoils is generally detrimental to the operation of the fan or compressor, and is generally detrimental to the operation of the gas turbine engine.

Accordingly, it is desirable to provide a mistuned rotor for a fan or compressor and methods for manufacture of the mistuned rotor, in which the one or more airfoils of the rotor are mistuned to reduce susceptibility to flutter. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a rotor for a gas turbine engine. The rotor includes a plurality of airfoils each extending from a root to a tip and having a leading edge opposite a trailing edge. Each airfoil of the plurality of airfoils has a span that extends from 0% at the root to 100% at the tip, a chord that extends from 0% at the leading edge to 100% at the trailing edge and a pressure side opposite a suction side. The pressure side of each airfoil of the plurality of airfoils has a pressure side surface shape based on an operating state of the rotor and the suction side of each airfoil of the plurality of airfoils has a suction side surface shape based on the operating state of the rotor. Each airfoil of the plurality of airfoils has the same suction side surface shape between 10% and 90% of the chord and between 80% and 100% of the span at a first operating state of the rotor. At least one first airfoil of the plurality of airfoils has a different suction side surface shape between 10% and 90% of the chord and between 80% and 100% of the span than at least one second airfoil of the plurality of airfoils at a static state of the rotor.

Also provided according to various embodiments is a method for manufacturing a rotor for a gas turbine engine. The rotor includes a plurality of airfoils. The method includes determining, by a processor, a first working shape for a suction side surface of each airfoil of the plurality of airfoils at a first operating state of the rotor. Each airfoil of the plurality of airfoils includes a suction side having the suction side surface opposite a pressure side having a pressure side surface, a leading edge opposite a trailing edge and extending from a root to a tip. Each airfoil of the plurality of airfoils has a span that extends from 0% at the root to 100% at the tip and a chord that extends from 0% at the leading edge to 100% at the trailing edge. The first working shape for the suction side surface is the same for each airfoil of the plurality of airfoils between 10% and 90% of the chord and 80% and 100% of the span. The method includes determining, by the processor, a second working shape for at least one of the suction side surface and the pressure side surface of at least one first airfoil of the plurality of airfoils between 0% and 50% of the span that is different than a third working shape for at least one of the suction side surface and the pressure side surface of at least one second airfoil of the plurality of airfoils between 0% and 50% of the span at the first operating state of the rotor. The method includes determining, by the processor, a static shape for each airfoil of the plurality of airfoils at a static state of the rotor. The static shape is based on at least one of the first working shape, the second working shape and the third working shape. The method includes generating, by the processor, a user interface for rendering on a display that includes instructions to manufacture each airfoil of the plurality of airfoils based on the static shape.

Also provided is a rotor for a gas turbine engine. The rotor includes a plurality of airfoils each extending from a root to a tip and having a leading edge opposite a trailing edge. Each airfoil of the plurality of airfoils has a span that extends from 0% at the root to 100% at the tip, and a pressure side opposite a suction side. The pressure side of each airfoil of the plurality of airfoils has a pressure side surface shape based on an operating state of the rotor and the suction side of each airfoil of the plurality of airfoils has a suction side surface shape based on the operating state of the rotor. Each airfoil of the plurality of airfoils has the same suction side surface shape and the same pressure side surface shape between 80% and 100% of the span at a first operating state of the rotor. At least one first airfoil of the plurality of airfoils has the pressure side surface shape between 0% and 50% of the span that is different than the pressure side surface shape between 0% and 50% of the span of at least one second airfoil of the plurality of airfoils at the first operating state of the rotor. The at least one first airfoil of the plurality of airfoils has a different suction side surface shape between 80% and 100% of the span than the at least one second airfoil of the plurality of airfoils at a static state of the rotor.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
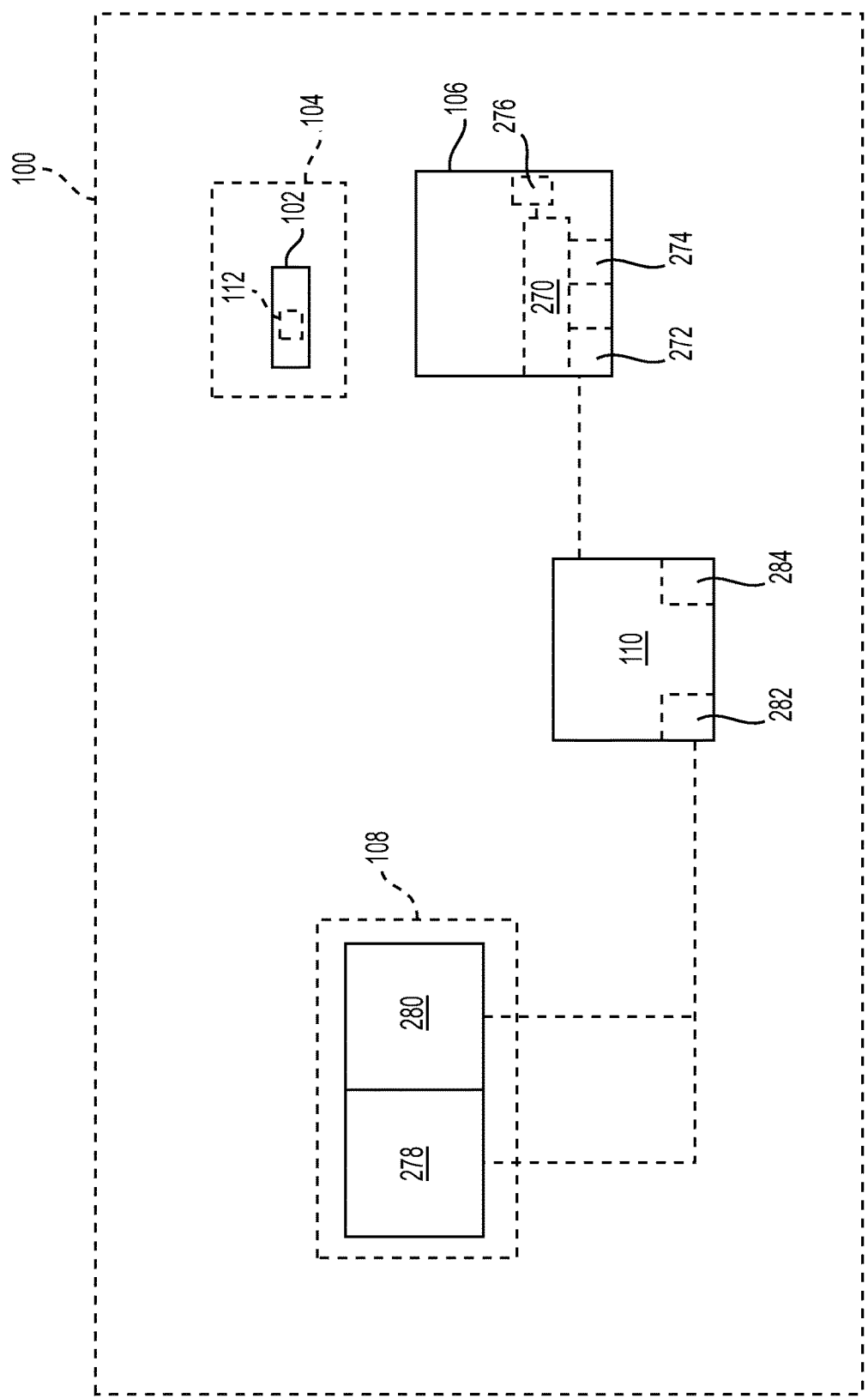
FIG. 1 is a functional block diagram illustrating a rotor manufacturing system for a mistuned rotor for use with a gas turbine engine in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of rotor, and the rotor for a fan or compressor of a gas turbine engine is merely one exemplary embodiment according to the present disclosure. In addition, while the rotor is described herein as being employed with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the manufacturing system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a functional block diagram of a rotor manufacturing system 100 for a rotor 102 for a gas turbine engine 104 according to various embodiments. In one example, the rotor manufacturing system 100 includes a manufacturing system 106, a human-machine interface 108 and a controller 110. As will be discussed, the rotor manufacturing system 100 manufactures and machines airfoils 112, 114 of the rotor 102 to provide an intentional mistuning of the airfoils 112, 114 of the rotor 102, and thus, a mistuned rotor. The intentional mistuning of the rotor 102 reduces a susceptibility of the airfoils 112, 114 to flutter while also reducing acoustic energy generated by the operation of the rotor 102. In this regard, as the airfoils 112, 114 are tuned or modified to derive a particular natural vibratory frequency difference between the airfoils 112, 114 during a first operational state of the rotor 102, the natural vibratory frequencies of the airfoils 112, 114 may be tailored to reduce the susceptibility of flutter while also reducing acoustic energy generation. As will be discussed, between about 80% to about 100% span, each of the airfoils 112, 114 has the same first working shape in the first operational state of the rotor 102, which reduces aerodynamic variations between the tips of adjacent airfoils 112, 114 and thereby reduces acoustic energy. The airfoils 112 have a second working shape between about 0% and about 50% of the span in the first operating state of the rotor 102. The adjacent airfoils 114, however, have a third working shape between about 0% and about 50% of the span in the first operating state of the rotor 102, which is different than the second working shape. The difference between the second working shape and the third working shape results in a difference between the natural vibratory frequencies of the airfoils 112, 114, which in turn reduces susceptibility to flutter. The airfoils 112, 114 also have a static shape in a static state or second operating state of the rotor 102, which is determined based on the first working shape, the second working shape and the third working shape, and the airfoils 112, 114 are manufactured or machined based on the static shape. As will be discussed, the first operating state of the rotor 102 is a hot or rotating state of the rotor 102, or an operating state in which the rotor 102 is moving or rotating at a speed greater than about 900 feet per second (ft/s). The second operating state of the rotor 102 is an operating state in which the rotor 102 is static, stationary or unmoving. It should be noted that while the description herein refers to the rotor 102 having two airfoils 112, 114 with two different natural frequencies, the rotor 102 may have any number of airfoils each with different natural frequencies if desired.

Figure 2:
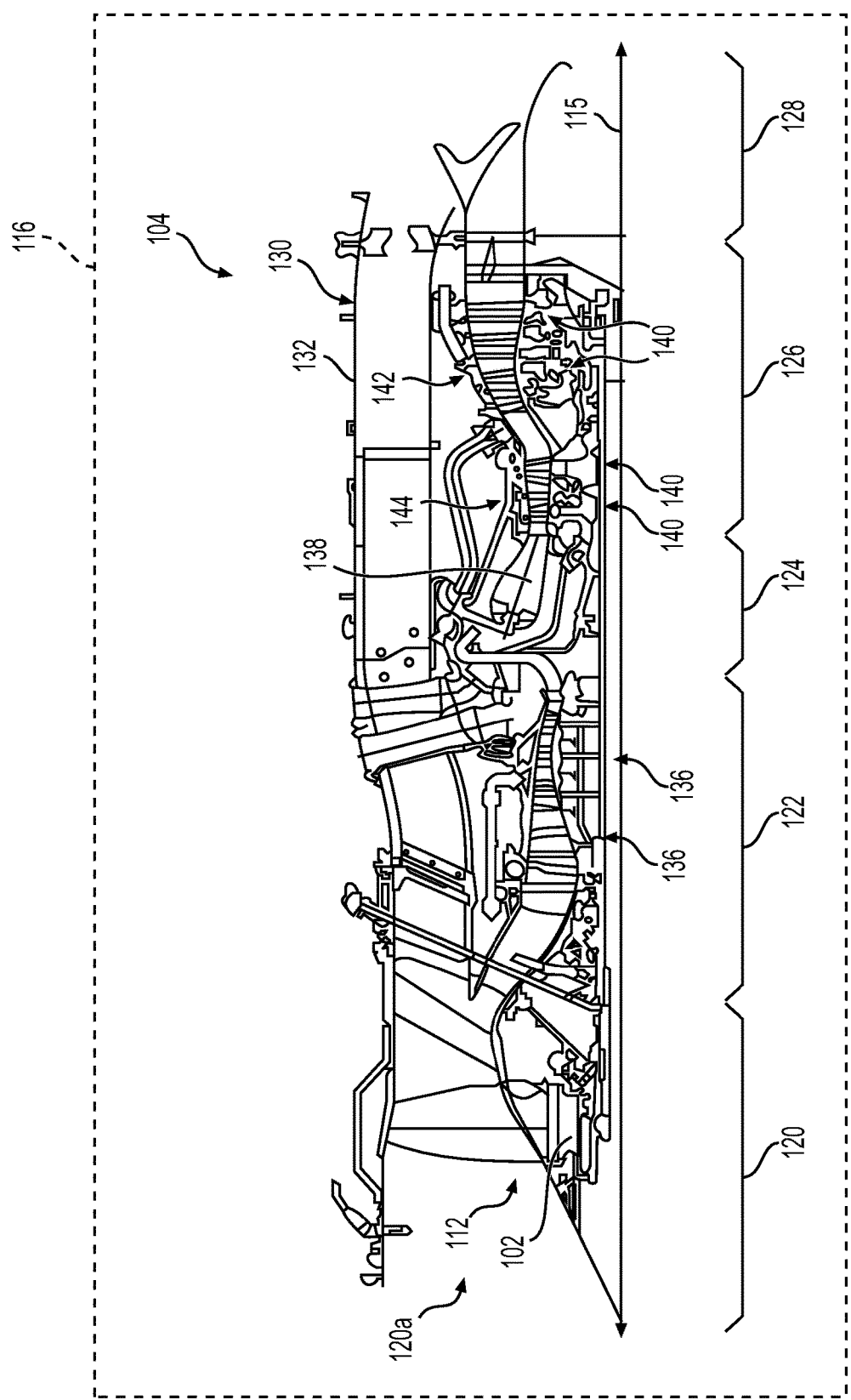
FIG. 2 is a schematic cross-sectional illustration of the gas turbine engine, which includes the mistuned rotor manufactured by the rotor manufacturing system of FIG. 1 in accordance with the various teachings of the present disclosure.

Initially, with reference to FIG. 2, a partial, cross-sectional view of the gas turbine engine 104 is shown with the remaining portion of the gas turbine engine 104 being substantially axisymmetric about a longitudinal axis 115, which also comprises an axis of rotation for the gas turbine engine 104. In the depicted embodiment, the gas turbine engine 104 is an annular multi-spool turbofan gas turbine jet engine within an aircraft 116, although other arrangements and uses may be provided. The gas turbine engine 104 includes the rotor 102, which includes the airfoils 112, 114 manufactured by an airfoil manufacturing system 300 (FIG. 14) of the rotor manufacturing system 100, which will be discussed with regard to FIGS. 14-16. The airfoil manufacturing system 300 ensures that the airfoils 112, 114 of the rotor 102 are manufactured by the manufacturing system 106 (FIG. 1) to reduce susceptibility to flutter, while also reducing acoustic energy. Thus, the airfoil manufacturing system 300 generates the mistuned rotor 102 for use with the gas turbine engine 104.

In this example, with continued reference to FIG. 2, the gas turbine engine 104 includes a fan section 120, the compressor section 122, a combustor section 124, a turbine section 126, and an exhaust section 128. In one example, the fan section 120 includes a fan 120a. The fan 120a includes the airfoils 112, 114 mounted on the rotor 102 that draws air into the gas turbine engine 104 and accelerates it. A fraction of the accelerated air exhausted from the fan section 120 is directed through an outer bypass duct 130 and the remaining fraction of air exhausted from the fan section 120 is directed into the compressor section 122. The outer bypass duct 130 is generally defined by an outer casing 132 that is spaced apart from and surrounds an exhaust guide vane.

The compressor section 122 includes one or more compressors 136. The number of compressors in the compressor section 122 and the configuration thereof may vary. In certain embodiments, one or more of the compressors 136 in the compressor section 122 include the rotor 102 having the airfoils 112, 114. The compressors 136 sequentially raise the pressure of the air and direct a majority of the high pressure air into the combustor section 124. A fraction of the compressed air bypasses the combustor section 124 and is used to cool, among other components, turbine blades in the turbine section 126.

In the embodiment of FIG. 2, in the combustor section 124, which includes a combustion chamber 138, the high pressure air is mixed with fuel, which is combusted. The high-temperature combustion air or combustive gas flow is directed into the turbine section 126. In this example, the turbine section 126 includes one or more turbines 140 disposed in axial flow series. It will be appreciated that the number of turbines, and/or the configurations thereof, may vary. The combustive gas expands through and rotates the turbines 140. The combustive gas flow then exits turbine section 126 for mixture with the cooler bypass airflow from the outer bypass duct 130 and is ultimately discharged from gas turbine engine 104 through exhaust section 128. As the turbines 140 rotate, each drives equipment in the gas turbine engine 104 via concentrically disposed shafts or spools. Generally, the turbines 140 in the turbine section 126, the compressors 136 in the compressor section 122 and the rotor 102 of the fan section 120 are mechanically linked by one or more shafts or spools. For example, in a two spool turbofan engine platform, the turbine rotors contained within a high pressure (HP) turbine stage 142 may be rotationally fixed to the compressors 136 contained within compressor section 122 by a HP shaft, while the turbines 140 contained within a low pressure (LP) turbine stage 144 may be rotationally fixed to the rotor 102 of the fan section 120 by a coaxial LP shaft. In other embodiments, gas turbine engine 104 may be a single spool engine or a multi-spool engine containing more than two coaxial shafts.

Figure 3:
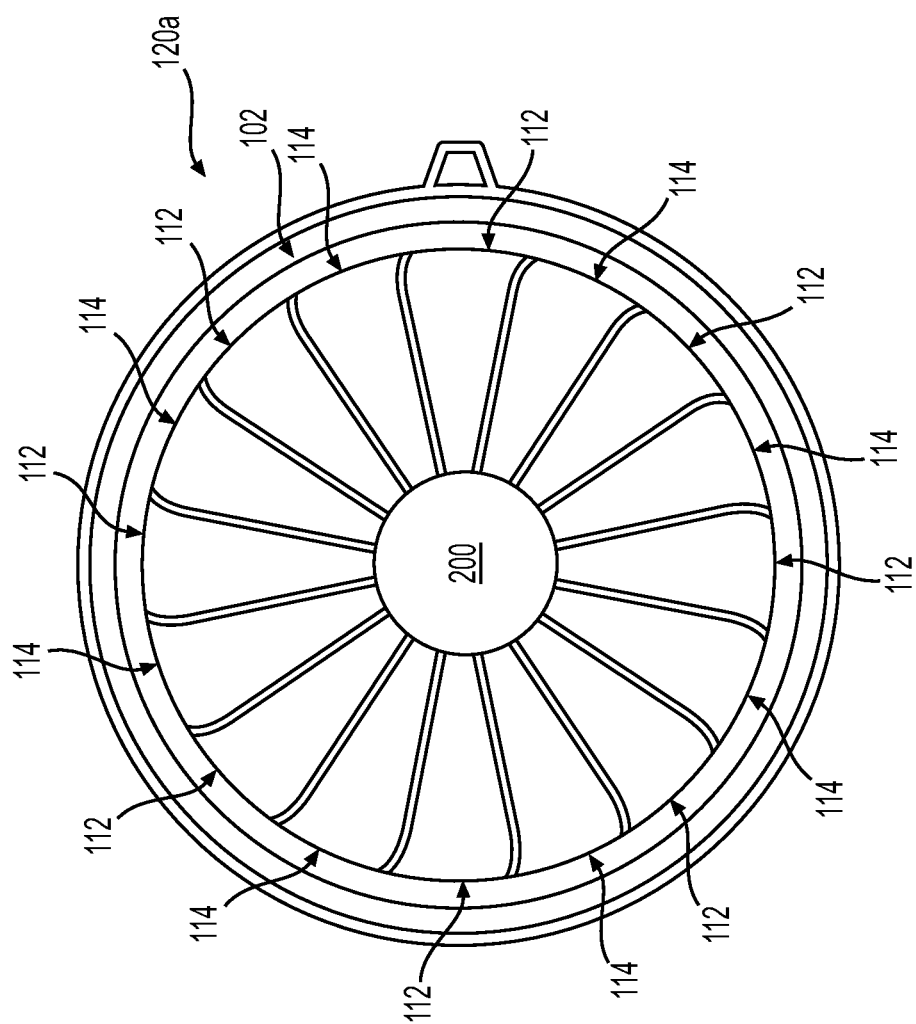
FIG. 3 is a front view of the mistuned rotor manufactured by the rotor manufacturing system of FIG. 1, in which the mistuned rotor includes a plurality of first airfoils that alternate with a plurality of second airfoils.

With reference to FIG. 3, a front view of the fan 120a is shown. As discussed, the fan 120a includes the rotor 102 having the plurality of airfoils 112, 114. In the example of FIG. 3, the rotor 102 is a fan axial rotor. The rotor 102 includes a rotor disk 200 and in this example, the plurality of rotor blades or the airfoils 112, 114. Each of the rotor blades may be referred to as an "airfoil 112 or airfoil 114." In this example, the airfoils 112, 114 alternate about the circumference of the rotor disk 200 such that one of the airfoils 112 is directly adjacent to one of the airfoils 114, a second one of the airfoils 112 is directly adjacent to a second one of the airfoils 114, and so on, about the circumference of the rotor disk 200.

Figure 4:
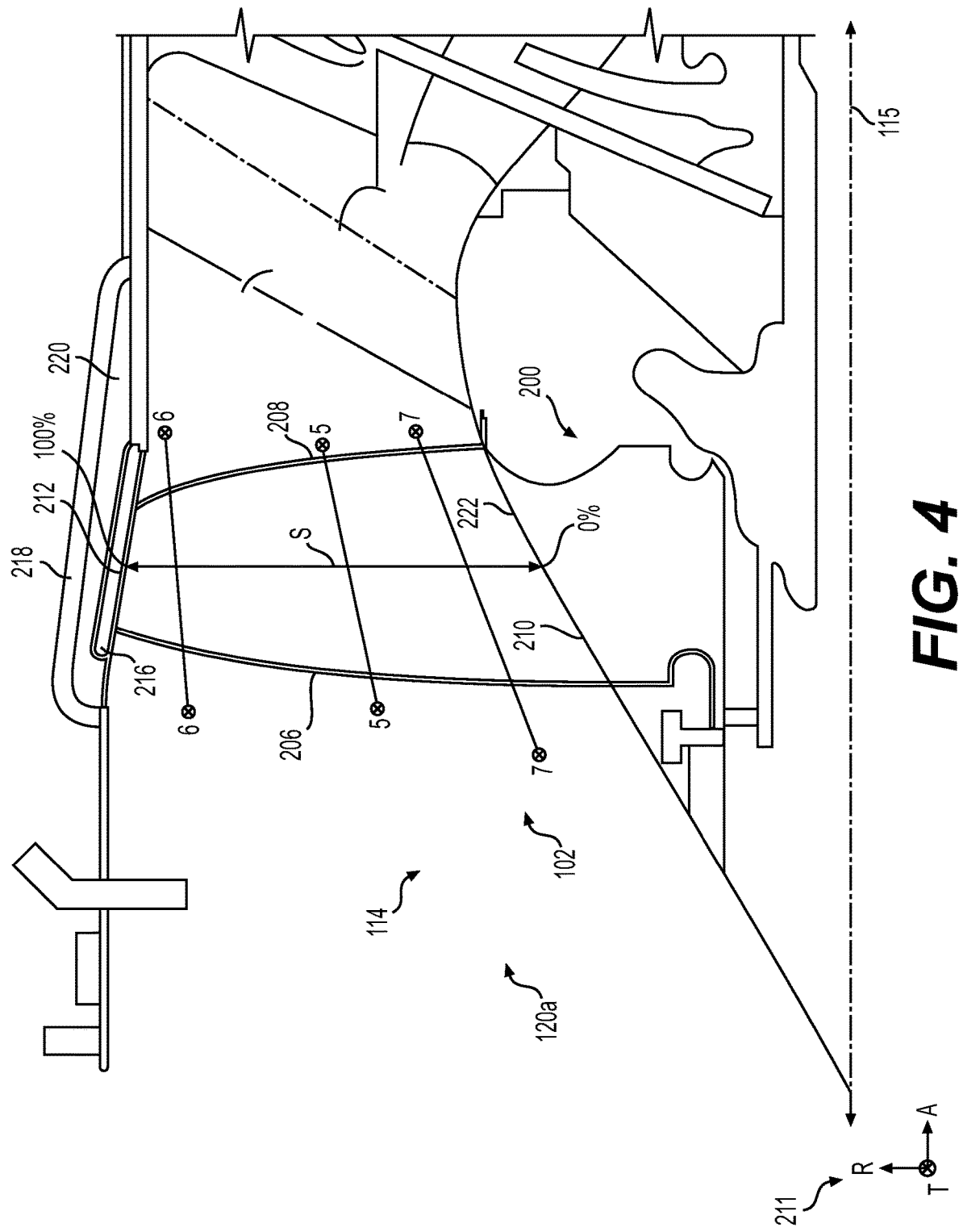
FIG. 4 is a detail cross-sectional view of the mistuned rotor manufactured by the rotor manufacturing system of FIG. 1 for use in a fan section of the gas turbine engine, which illustrates one of the first airfoils of the mistuned rotor according to various embodiments.

With reference to FIG. 4, one of the plurality of airfoils 112 for use with the rotor 102 of the gas turbine engine 104 is shown. The airfoils 112 extend in a radial direction (relative to the longitudinal axis 115 of the gas turbine engine 104) in an alternating pattern about the periphery of the rotor disk 200 (FIG. 3). The airfoils 112 each include a leading edge 206, an axially-opposed trailing edge 208, a base or root 210, and a radially-opposed tip 212. The tip 212 is spaced from the root 210 in a blade height, span S or spanwise direction, which generally corresponds to the radial direction or R-axis of a coordinate legend 211 in the view of FIG. 4. In this regard, the radial direction or R-axis is radially outward and orthogonal to the axial direction or X-axis, and the axial direction or X-axis is parallel to the longitudinal axis 115 or axis of rotation of the gas turbine engine 104. A tangential direction or T-axis is mutually orthogonal to the R-axis and the X-axis. As shown in FIG. 4, the span S of each of the airfoils 112 is 0% at the root 210 (where the airfoil 112 is coupled to a rotor hub 222) and is 100% at the tip 212.

Figure 4A:
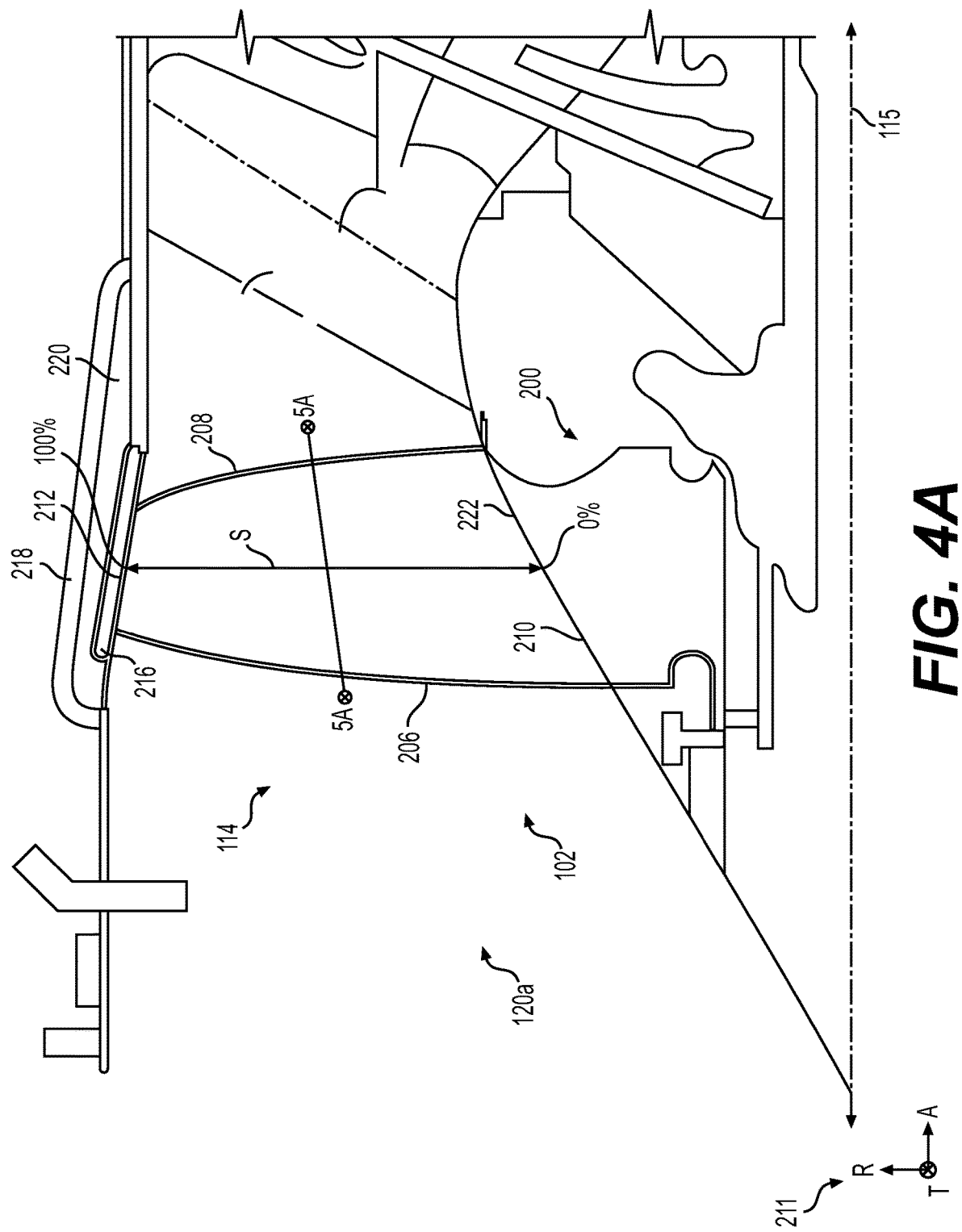
FIG. 4A is a detail cross-sectional view of the mistuned rotor manufactured by the rotor manufacturing system of FIG. 1 for use in a fan section of the gas turbine engine, which illustrates one of the second airfoils of the mistuned rotor according to various embodiments.

With reference to FIG. 4A, one of the plurality of airfoils 114 for use with the rotor 102 of the gas turbine engine 104 is shown. The airfoils 114 extend in a radial direction (relative to the longitudinal axis 115 of the gas turbine engine 104) in an alternating pattern about the periphery of the rotor disk 200 (FIG. 3). The airfoils 114 each include the leading edge 206, the axially-opposed trailing edge 208, the base or root 210, and the radially-opposed tip 212. The tip 212 is spaced from the root 210 in the blade height, span S or spanwise direction, which generally corresponds to the radial direction or R-axis of a coordinate legend 211 in the view of FIG. 4A. As shown in FIG. 4A, the span S of each of the airfoils 114 is 0% at the root 210 (where the airfoil 112 is coupled to a rotor hub 222) and is 100% at the tip 212.

In this example, with reference to FIGS. 4 and 4A, the airfoils 112, 114 are arranged in a ring or annular array (FIG. 3) surrounded by a static fan shroud 216. The static fan shroud 216 is, in turn, circumscribed by an annular housing piece 218 defining a containment pocket 220. The airfoils 112, 114 and the rotor disk 200 are generally composed of a metal, metal alloy or polymer-based material, such as a composite. In one example, the airfoils 112, 114 are integrally formed with the rotor disk 200 as a monolithic or single piece structure commonly referred to as a bladed disk or "blisk." In other examples, the airfoils 112, 114 may be insert-type blades, which are received in mating slots provided around the outer periphery of rotor disk 200. In still further examples, the rotor 102 may have a different construction. Generally, then, it should be understood that the rotor 102 is provided by way of non-limiting example and that the rotor 102 (and the airfoils 112, 114) may be fabricated by the manufacturing system 106 utilizing various different manufacturing approaches.

Regardless of its construction, the rotor 102 includes a rotor hub 222 defining a hub flow path. The hub flow path extends over the outer surface of the rotor disk 200 and between the airfoils 112, 114 to guide airflow along from the inlet end (inducer or leading edge) to the outlet end (exducer or trailing edge) of the rotor 102. As shown in FIGS. 4 and 4A, each of the plurality of airfoils 112, 114 is coupled to the rotor hub 222 at the root 210 (0% span). It should be noted that while each of the plurality of airfoils 112, 114 are illustrated herein as being coupled to the rotor hub 222 at an angle relative to the axial direction (A-axis), one or more of the plurality of airfoils 112, 114 may be coupled to the rotor hub 222 along a straight line. Further, it should be noted that one or more of the plurality of airfoils 112, 114 may be coupled to the rotor hub 222 along a complex curved surface. It should be noted that in the instances where the plurality of airfoils 112, 114 are coupled to the rotor hub 222 at an angle, the span remains at 0% at the root 210. In other words, the span of each of the plurality of airfoils 112, 114 remains at 0% at the root 210 regardless of the shape of the rotor hub 222.

Figure 5:
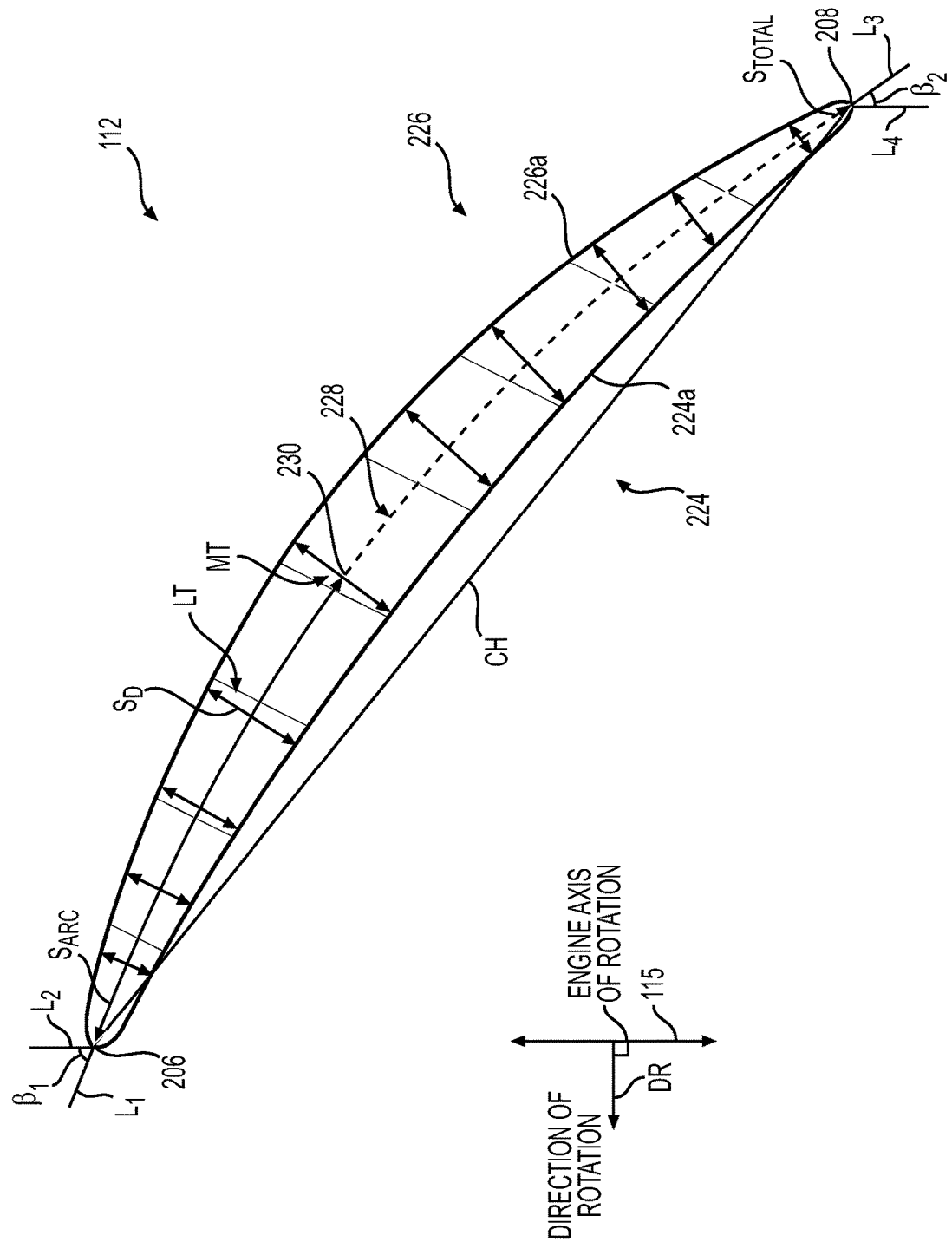
FIG. 5 is a cross-sectional view of the first airfoil of FIG. 4, taken along line 5-5 of FIG. 4.

With reference to FIG. 5, each of the airfoils 112 further includes a first principal face or a "pressure side" 224 and a second, opposing face or a "suction side" 226. The pressure side 224 has a pressure side surface 224a; and the suction side 226 has a suction side surface 226a. The pressure side 224 and the suction side 226 extend in a 0 direction along a chord line CH and are opposed in a thickness direction normal to a mean camber line 228, which is illustrated as a dashed line in FIG. 5 that extends from the leading edge 206 to the trailing edge 208. The pressure side 224 and the suction side 226 extend from the leading edge 206 to the trailing edge 208. In one example, each of the airfoils 112 is somewhat asymmetrical and has a total camber $\theta_T$ along the mean camber line 228. The pressure side 224 has a contoured, generally concave surface geometry, which gently bends or curves in three dimensions. The suction side 226 has a contoured, generally convex surface geometry, which likewise bends or curves in three dimensions. In other embodiments, the airfoils 112 may not be cambered and may be either symmetrical or asymmetrical.

Each of the airfoils 112 also has an inlet metal angle $\beta 1$ defined at the leading edge 206. The inlet metal angle $\beta 1$ is the angle between a reference line L1 that is tangent to the mean camber line 228 at the leading edge 206 and a reference line L2 that is parallel to the engine center line or the longitudinal axis 115 of the gas turbine engine 104 (FIG. 2) and normal to the direction of rotation DR. Each of the airfoils 112 also have an exit metal angle β2 defined at the trailing edge 208. The exit metal angle β2 is the angle between a reference line L3 that is tangent to the mean camber line 228 at the trailing edge 208 and a reference line L4 that is parallel to the engine center line or the longitudinal axis 115 of the gas turbine engine 104 (FIG. 2) and normal to the direction of rotation DR. Generally, at a particular span of the airfoil 112, the airfoils 112 have the inlet metal angle β1 and the exit metal angle β2. The inlet metal angle β1 and the exit metal angle β2 for the airfoil 112 may vary over the span S of the airfoil 112. As used herein, a total camber $\theta_T$ of the airfoil 112 at a particular span is defined by the following equation:

$$\theta_T = \beta_1 - \beta_2 \quad (1)$$

Wherein, $\theta_T$ is the total camber of the airfoil 112 at the particular span; β1 is the inlet metal angle in degrees; and β2 is the exit metal angle in degrees.

In addition, at each spanwise location along the span S of each of the airfoils 112, each of the airfoils 112 has a total length or total arc distance $S_{Total}$ defined from the leading edge 206 to the trailing edge 208 along the mean camber line 228. In addition, at each spanwise location along the span S of each of the airfoils 112, each of the airfoils 112 has a first length or first arc distance $S_{Arc}$, which is defined as the arc distance along the mean camber line 228 from the leading edge 206 to a position 230 of local maximum thickness MT for the particular span S. Stated another way, for each spanwise location along the span S of the airfoils 112, the airfoil 112 has a position 230 or location of local maximum thickness LMT, which is defined as a ratio of the first arc distance $S_{Arc}$ along the mean camber line 228 associated with the respective spanwise location between the leading edge 206 and the location of the local maximum thickness LMT to the total arc distance $S_{Total}$ along the respective mean camber line 228 from the leading edge 206 to the trailing edge 208, or:

$$LMT = \frac{S_{Arc}}{S_{Total}} \quad (2)$$

Wherein, LMT is the location of local maximum thickness for the particular spanwise location of the airfoil 112; $S_{Arc}$ is the first arc distance defined along the mean camber line 228 between the leading edge 206 and the position 230 of the local maximum thickness MT for the particular spanwise location of the airfoil 112; and $S_{Total}$ is total arc distance along the mean camber line 228 from the leading edge 206 to the trailing edge 208 for the particular spanwise location of the airfoil 112. The local maximum thickness MT is the greatest distance between the pressure side 224 and the suction side 226 that is normal to the mean camber line 228 for the particular spanwise location. It should be noted that each of the airfoils 112 also have positions of local thickness LT. The local thickness LT is a distance $S_D$ from the pressure side 224 to the suction side 226 at any given fraction of the chord CH, wherein the distance $S_D$ is defined as normal to the mean camber line 228.

Figure 5A:
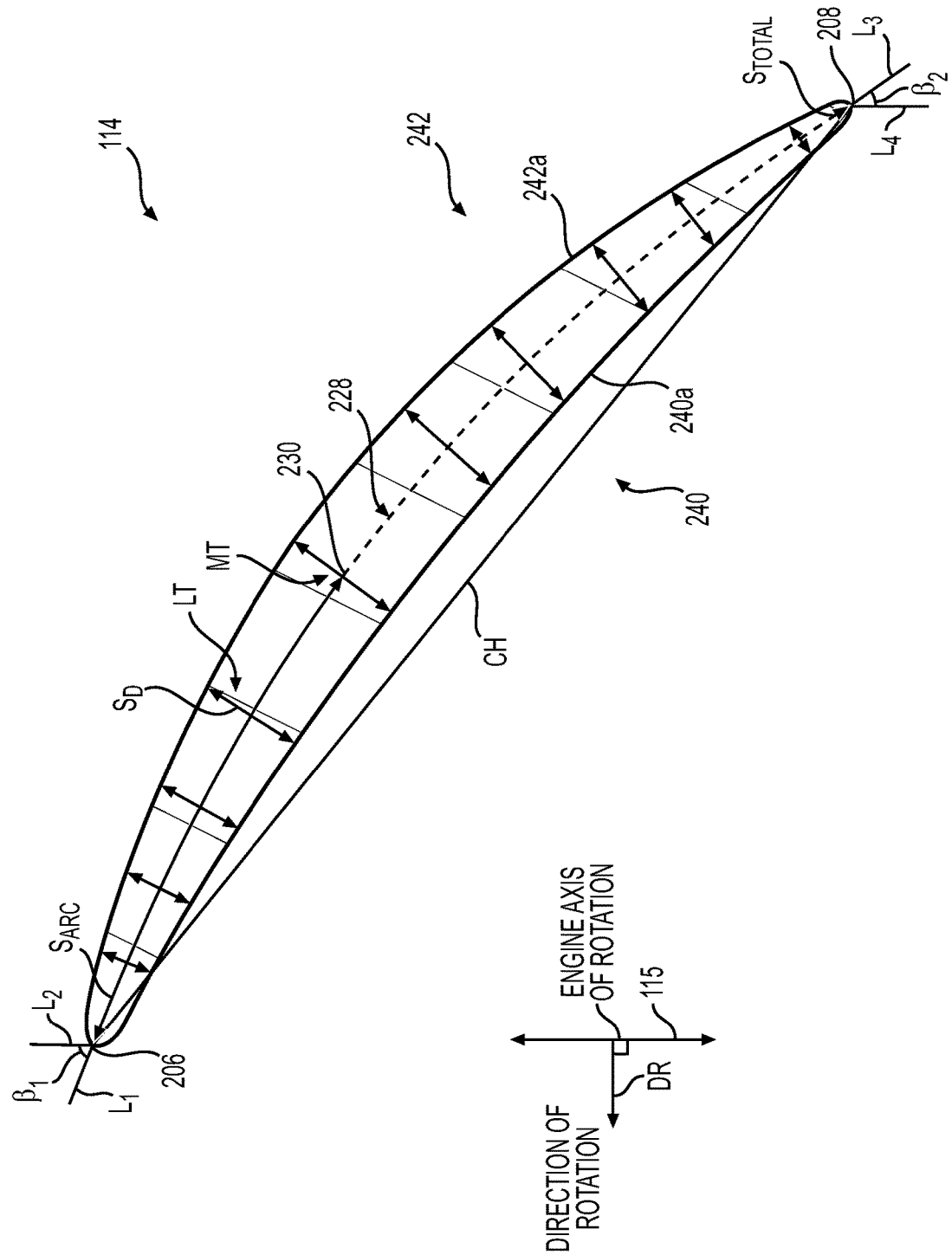
FIG. 5A is a cross-sectional view of the second airfoil of FIG. 4A, taken along line 5A-5A of FIG. 4A.

With reference to FIG. 5A, each of the airfoils 114 further includes a first principal face or a "pressure side" 240 and a second, opposing face or a "suction side" 242. The pressure side 240 has a pressure side surface 240a; and the suction side 242 has a suction side surface 242a. The pressure side 240 and the suction side 242 extend in a chordwise direction along a chord line CH and are opposed in a thickness direction normal to the mean camber line 228, which is illustrated as a dashed line in FIG. 5A that extends from the leading edge 206 to the trailing edge 208. The pressure side 240 and the suction side 226 extend from the leading edge 206 to the trailing edge 208. In one example, each of the airfoils 114 is somewhat asymmetrical and has a total camber $\theta_T$ along the mean camber line 228. The pressure side 240 has a contoured, generally concave surface geometry, which gently bends or curves in three dimensions. The suction side 242 has a contoured, generally convex surface geometry, which likewise bends or curves in three dimensions. In other embodiments, the airfoils 114 may not be cambered and may be either symmetrical or asymmetrical.

Each of the airfoils 114 also has the inlet metal angle β1 defined at the leading edge 206. Each of the airfoils 114 also have the exit metal angle β2 defined at the trailing edge 208. At a particular span of the airfoil 114, the airfoils 114 have the inlet metal angle β1 and the exit metal angle β2. The inlet metal angle β1 and the exit metal angle β2 for the airfoil 114 may vary over the span S of the airfoil 114. The total camber $\theta_T$ of the airfoil 114 at a particular span is defined by equation (1).

In addition, at each spanwise location along the span S of each of the airfoils 114, each of the airfoils 114 has the total length or total arc distance $S_{Total}$ defined from the leading edge 206 to the trailing edge 208 along the mean camber line 228. In addition, at each spanwise location along the span S of each of the airfoils 114, each of the airfoils 114 has the first length or first arc distance $S_{Arc}$, which is defined as the arc distance along the mean camber line 228 from the leading edge 206 to the position 230 of local maximum thickness MT for the particular span S. Stated another way, for each spanwise location along the span S of the airfoils 114, the airfoil 114 has the position 230 or location of local maximum thickness LMT, which is defined as a ratio of the first arc distance $S_{Arc}$ along the mean camber line 228 associated with the respective spanwise location between the leading edge 206 and the location of the local maximum thickness LMT to the total arc distance $S_{Total}$ along the respective mean camber line 228 from the leading edge 206 to the trailing edge 208, as defined in equation (2). The local maximum thickness MT is the greatest distance between the pressure side 240 and the suction side 242 that is normal to the mean camber line 228 for the particular spanwise location. It should be noted that each of the airfoils 114 also have positions of local thickness LT. The local thickness LT is the distance $S_D$ from the pressure side 240 to the suction side 242 at any given fraction of the chord CH, wherein the distance $S_D$ is defined as normal to the mean camber line 228.

Figure 6:
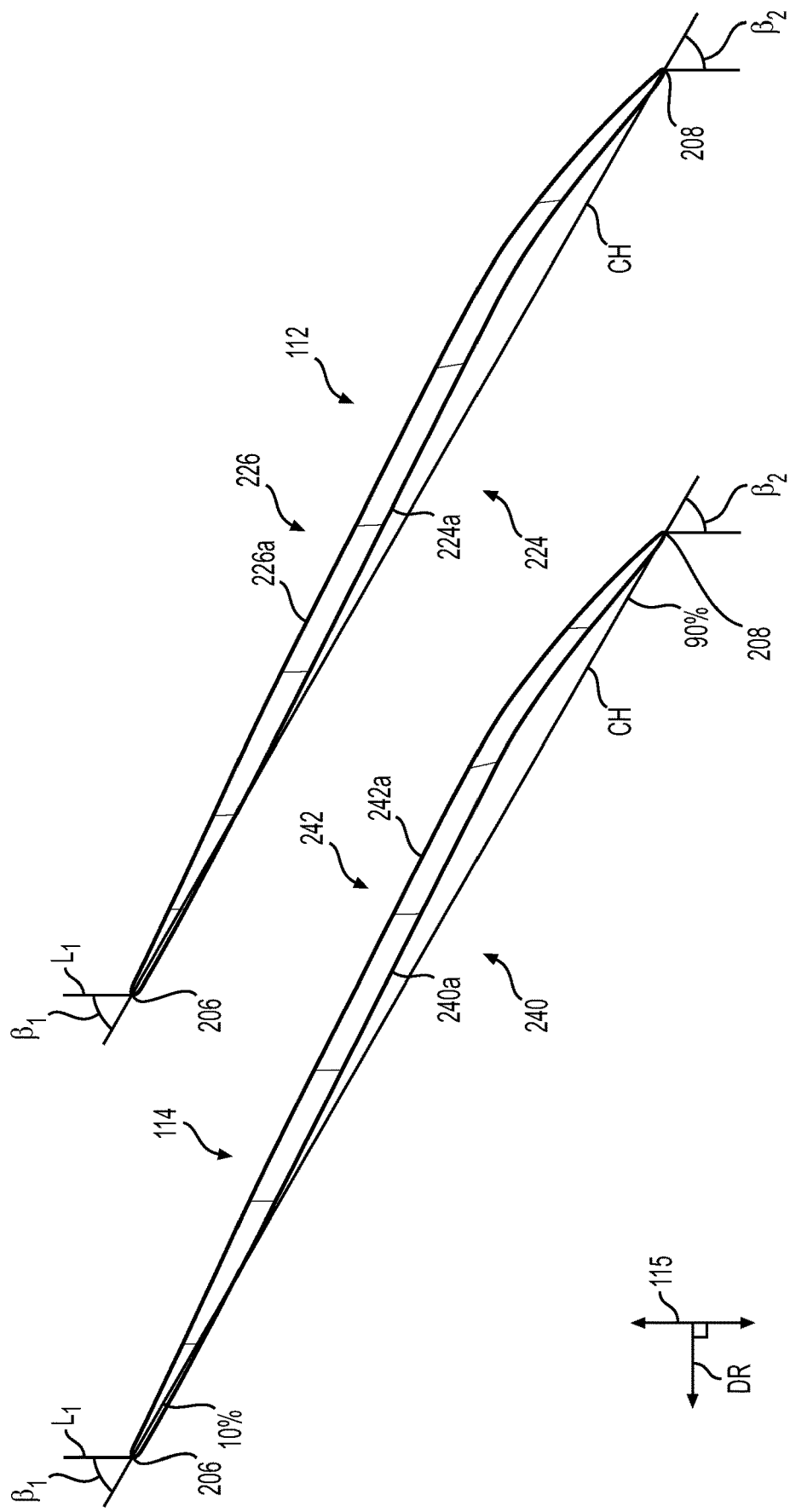
FIG. 6 is a cross-sectional view of one of the first airfoils that is directly adjacent to one of the second airfoils of the mistuned rotor of FIG. 3, taken along an arc length (tangential direction) of the rotor starting from line 6-6 of FIG. 4, which illustrates that a first working shape for the first airfoils and the second airfoils in a first operating state of the mistuned rotor is the same between about 80% span and about 100% span, and between about 10% and about 90% chord.

With reference back to FIG. 2, as will be discussed, in one example, each of the airfoils 112, 114 have different working shapes based on the operating state of the rotor 102, and thus, the operating state of the gas turbine engine 104, which provides for intentional mistuning of the rotor 102. In a first operating state, the gas turbine engine 104 is rotating, and the rotor 102 is rotating generally with a tip speed of the rotor 102 that is greater than about 900 feet per second. In a static state or second operating state, the gas turbine engine 104 and the rotor 102 are not rotating or are stationary. With reference to FIG. 6, FIG. 6 is a cross-sectional view through two adjacent airfoils 112, 114, taken along an arc length (in the tangential direction or along the T-axis) of the rotor 102 starting from line 6-6 of FIG. 4 into the page. As shown in FIG. 6, at 80% of the span S, in the first operating state of the rotor 102, the pressure side surface 224a, 240a of the airfoils 112, 114, respectively, is the same or has the same shape between about 10% and about 90% of the chord CH.

As also shown in FIG. 6, at 80% span, in the first operating state of the rotor 102, the suction side surface 226a, 242a of the airfoils 112, 114, respectively, is the same or has the same shape between about 10% and about 90% of the chord CH. In addition, each of the inlet metal angles β1 and the outlet metal angles β2 are substantially the same. By manufacturing the pressure side surfaces 224a, 240a and the suction side surfaces 226a, 242a of the airfoils 112, 114 to be the same or have the same shape in the first operating state of the rotor 102 from about 80% span to about 100% span and between about 10% and about 90% of the chord CH, the shape of the airfoils 112, 114 in the higher Mach number outboard region is the same during the first operating state or rotation of the rotor 102.

Figure 7:
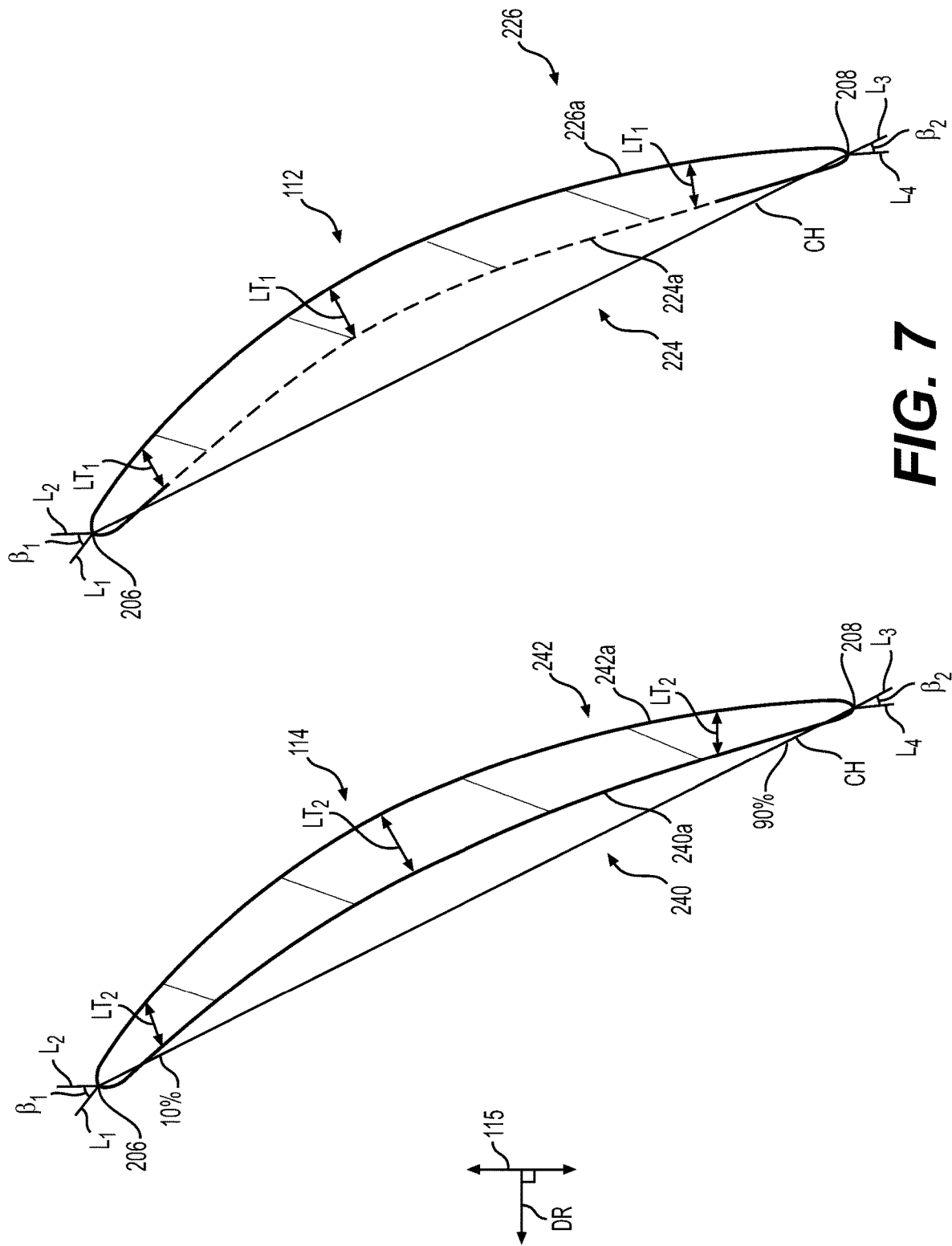
FIG. 7 is a cross-sectional view of one of the first airfoils that is directly adjacent to one of the second airfoils of the mistuned rotor of FIG. 3, taken along an arc length (tangential direction) of the rotor starting from line 7-7 of FIG. 4, which illustrates that a second working shape for the first airfoils is different than a third working shape for the second airfoils in the first operating state of the mistuned rotor between about 0% span and about 50% span, and between about 10% and about 90% chord.

With reference to FIG. 7, FIG. 7 is a cross-sectional view through two adjacent airfoils 112, 114, taken along an arc length (in the tangential direction or along the T-axis) of the rotor 102 starting from line 7-7 of FIG. 4 into the page. As shown in FIG. 7, at about 20% of the span S, in the first operating state of the rotor 102, the pressure side surface 224a, 240a of the airfoils 112, 114, respectively, is different between about 10% and about 90% of the chord CH. It should be noted that in the first operating state of the rotor 102, the pressure side surface 224a, 240a of the airfoils 112, 114, respectively, is different between about 0% span and about 50% span and between about 10% and about 90% of the chord CH. In this example, the airfoil 112 is tuned to be a lower vibratory natural frequency airfoil, and the airfoil 114 is tuned to be a higher natural vibratory frequency airfoil. Stated another way, in this example, the airfoil 114 has a natural vibratory frequency, which is greater than a natural vibratory frequency of the airfoil 112. In one example, the airfoil 112 has at least one local thickness LT1 between about 0% span and about 50% span and between about 10% and about 90% chord that is different than, and in this example, less than at least one local thickness LT2 of the airfoil 114. The differences in the local thicknesses LT1, LT2 results in a change in the natural vibratory frequency of the airfoils 112, 114. In this example, the airfoil 112 has a plurality of local thicknesses LT1 that are different than a plurality of local thicknesses LT2 of the airfoil 114. In this example, the different local thicknesses LT1, LT2 extend between about 0% span and about 50% span and between about 10% to about 90% chord CH such that the pressure side surface 224a of the airfoil 112 is different than the pressure side surface 240a of the airfoil 114 between about 0% span and about 50% span and between about 10% to about 90% chord CH due to the differences in the local thicknesses LT1, LT2. In this example, the different pressure side surface 224a shape (caused by the reduced thickness) between about 0% span and about 50% span and between about 10% to about 90% chord CH is illustrated with a dashed line in FIG. 7. It should be noted that the cross-section of FIG. 7 taken at 20% span is only an example, as the pressure side surface 224a shape of the airfoil 112 between about 10% and about 90% of the chord CH may be modified by reducing a maximum thickness of the airfoil 112 at any spanwise location between about 0% span and about 50% span, and thus, the spanwise location of about 20% shown herein is merely an example.

In addition, the differences in the local thicknesses LT1, LT2 results in a different shape for the pressure side surfaces 224a, 240a between about 0% span and about 50% span and between about 10% and about 90% of the chord CH. Thus, the airfoil 112 has a second working shape for the pressure side surface 224a between about 0% span and about 50% span and between about 10% and about 90% of the chord CH, which is different than a third working shape for the pressure side surface 240a between about 0% span and about 50% span and between about 10% and about 90% of the chord CH of the airfoil 114. Generally, the thickness of the airfoil 112 is reduced to result in a natural vibratory frequency change of about 3% to about 15%. In one example, the thickness of the airfoil 112 is reduced about 10% to about 30% of an initial maximum thickness of the airfoil 112 to arrive at the second working shape for the pressure side surface 224a between about 0% to about 50% span and between about 10% and about 90% chord. It should be noted that there are other ways to modify the shape of the pressure side surface 224a, 240a, and that the variation in thickness discussed herein is merely an example.

As also shown in FIG. 7, at 20% of the span S, in the first operating state of the rotor 102, the suction side surface 226a, 242a of the airfoils 112, 114, respectively, is the same or has the same shape between about 10% and about 90% of the chord CH. It should be noted that in the first operating state of the rotor 102, the suction side surface 226a, 242a of the airfoils 112, 114, respectively, is the same between about 0% span and about 50% span and between about 10% and about 90% of the chord CH, and the cross-section taken at 20% span is only an example, with the understanding that the suction side surface 226a, 242a of the airfoils 112, 114 between about 0% and about 50% of the span is the same along the respective one of the airfoils 112, 114. Stated another way, while the cross-section of FIG. 7 is taken at 20% span, the airfoils 112, 114 have the same suction side surface 226a, 242a shape, respectively, between about 0% span to about 50% span. In addition, each of the inlet metal angles β1 and the outlet metal angles β2 for the airfoils 112, 114 are substantially the same. By manufacturing the pressure side surfaces 224a, 240a to have a different shape while the suction side surfaces 226a, 242a of the airfoils 112, 114 have the same shape between about 0% span and about 50% span, and between about 10% and about 90% of the chord CH, the natural vibratory frequency of the airfoils 112, 114 is different, which reduces susceptibility to flutter. It should be noted that while the airfoils 112, 114 are described and illustrated herein as having pressure side surfaces 224a, 240a between about 0% span and about 50% span and between about 10% and about 90% of the chord CH that are different or have different working shapes in the first operating condition of the rotor 102, the airfoils 112, 114 may also have suction side surface 226a, 242a between about 0% span and about 50% span and between about 10% and about 90% of the chord CH that are different, if desired, which would result in different working shapes for the suction side surfaces 226a, 242a during the first operating state.

Figure 8:
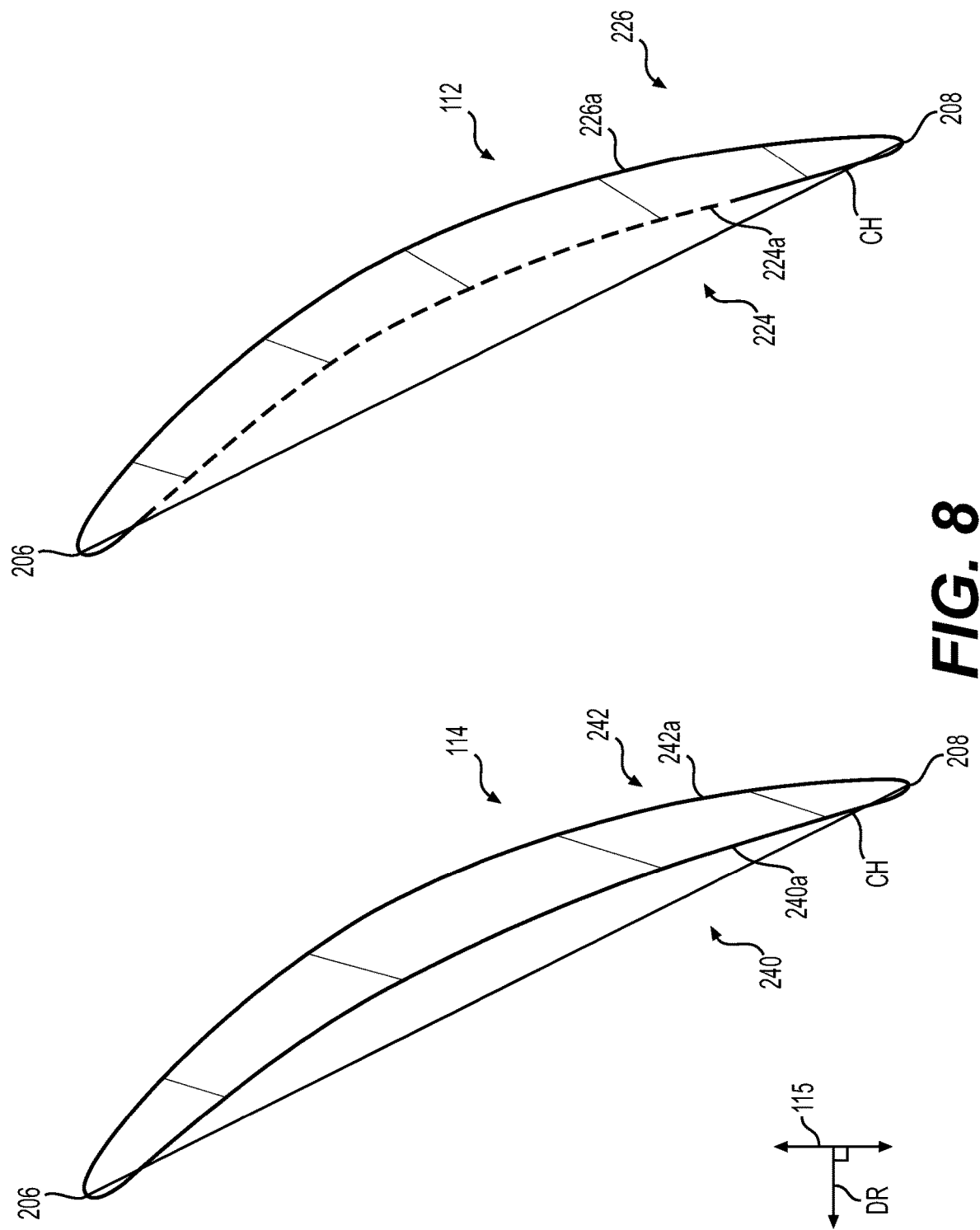
FIG. 8 is a cross-sectional view of one of the first airfoils that is directly adjacent to one of the second airfoils of the mistuned rotor of FIG. 3, taken along an arc length (tangential direction) of the rotor starting from line 7-7 of FIG. 4, which illustrates that a static shape for the first airfoils is different than a static shape for the second airfoils in a second operating state of the mistuned rotor between about 0% span and about 50% span.

As the airfoils 112, 114 have different pressure side surface 224a, 240a shapes between about 0% span and about 50% span and between about 10% and about 90% of the chord CH in the first operating state of the rotor 102, each of the airfoils 112, 114 have a static shape in the static or second operating state of the rotor 102, which is different. In this regard, with reference to FIG. 8, FIG. 8 is a cross-sectional view through two adjacent airfoils 112, 114, taken along an arc length (in the tangential direction or along the T-axis) of the rotor 102 starting from line 7-7 of FIG. 4 into the page. As shown in FIG. 8, the different pressure side surface 224a, 240a shapes in the first operating state of the rotor 102 result in the airfoils 112, 114 having different suction side surface 226a, 242a shapes between about 0% span and about 50% span and between about 10% and about 90% of the chord CH in the static state of the rotor 102 as the hot to cold deflections are different for each of the airfoils 112, 114. In this example, the different pressure side surface 224a shape (caused by the reduced thickness) between about 0% span and about 50% span and between about 10% to about 90% chord CH is illustrated with a dashed line in FIG. 8. Generally, as will be discussed, the airfoils 112 are manufactured based on the static shape for the airfoil 112, which is determined based on the first working shape and the second working shape; and the airfoils 114 are manufactured based on the static shape for the airfoil 114, which is determined based on the first working shape and the third working shape.

Figure 9:
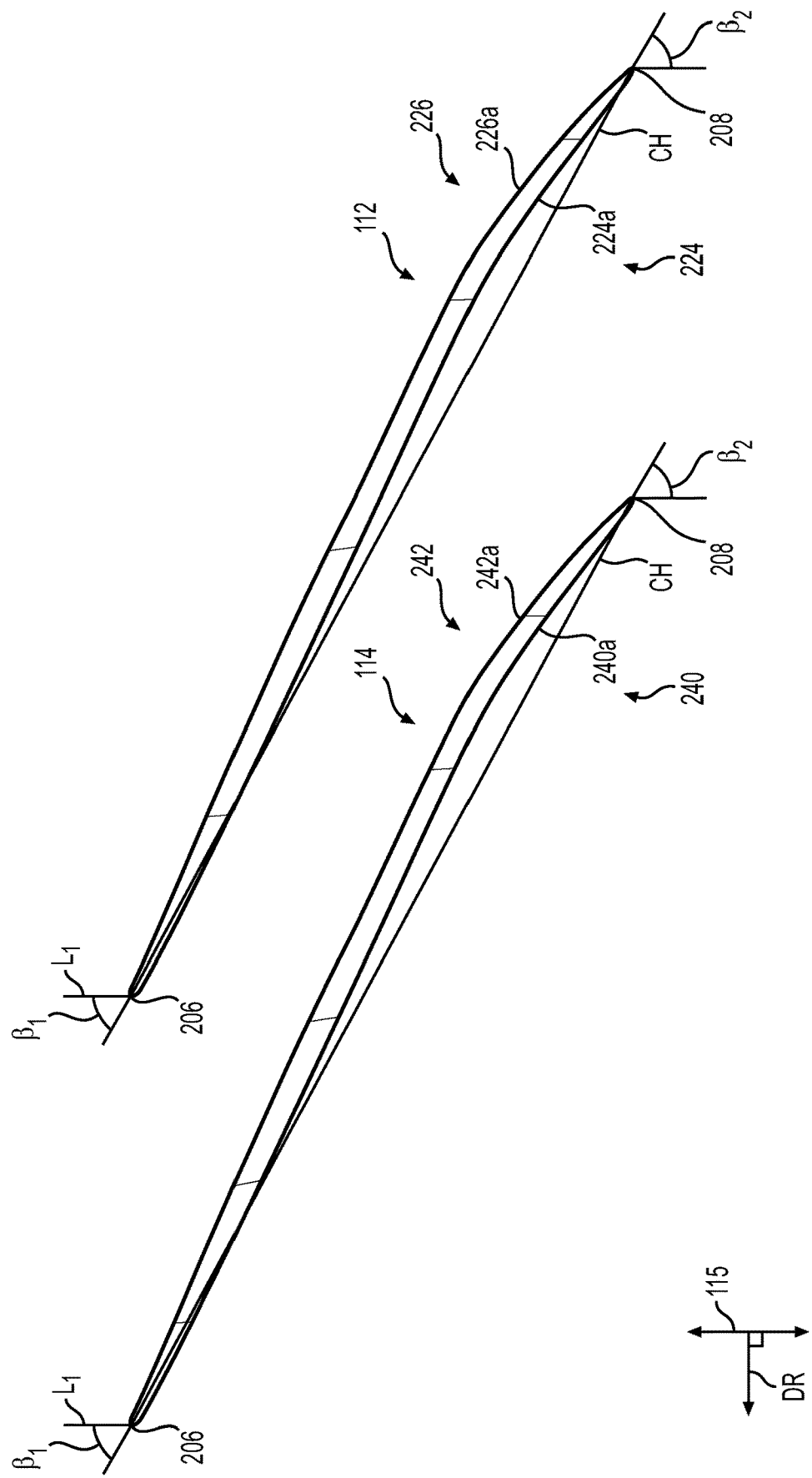
FIG. 9 is a cross-sectional view of one of the first airfoils that is directly adjacent to one of the second airfoils of the mistuned rotor of FIG. 3, taken along an arc length (tangential direction) of the rotor starting from line 6-6 of FIG. 4, which illustrates that a static shape for the first airfoils is different than a static shape for the second airfoils in the second operating state of the mistuned rotor between about 80% span and about 100% span.

In addition, with reference to FIG. 9, FIG. 9 is a cross-sectional view through two adjacent airfoils 112, 114, taken along an arc length (in the tangential direction or along the T-axis) of the rotor 102 starting from line 6-6 of FIG. 4 into the page. As shown in FIG. 9, the different pressure side surface 224a, 240a shapes result in the airfoils 112, 114 having different suction side surface 226a, 242a shapes between about 80% span and about 100% span and between about 10% and about 90% of the chord CH in the static operating state of the rotor 102.

Figure 10:
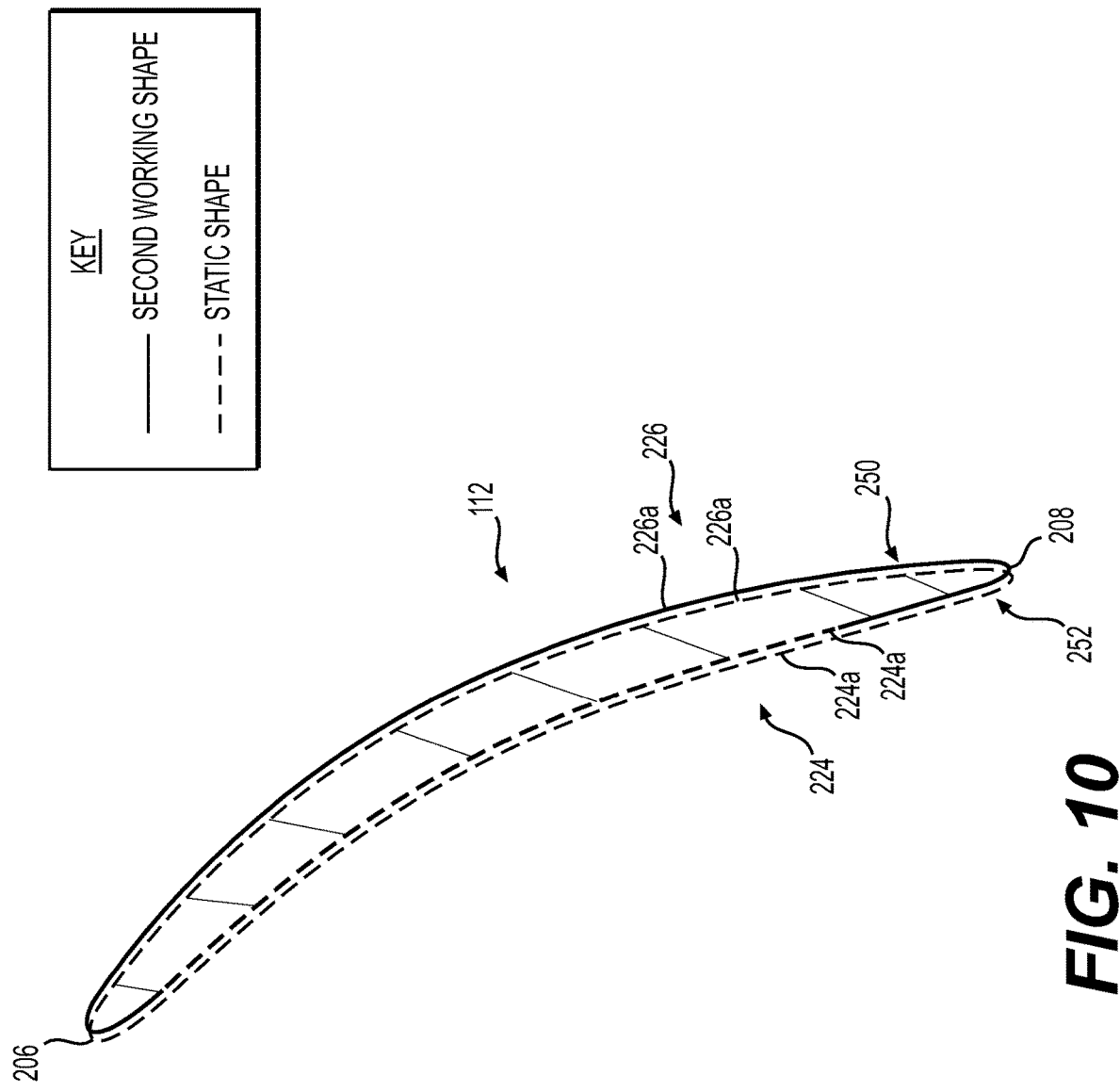
FIG. 10 is an overlay of a cross-section of the second working shape of the first airfoil in the first operating state of the mistuned rotor and a cross-section of the static shape of the first airfoil in the second operating state of the mistuned rotor between about 0% span and about 50% span taken from the perspective of line 7-7 of FIG. 4.
Figure 11:
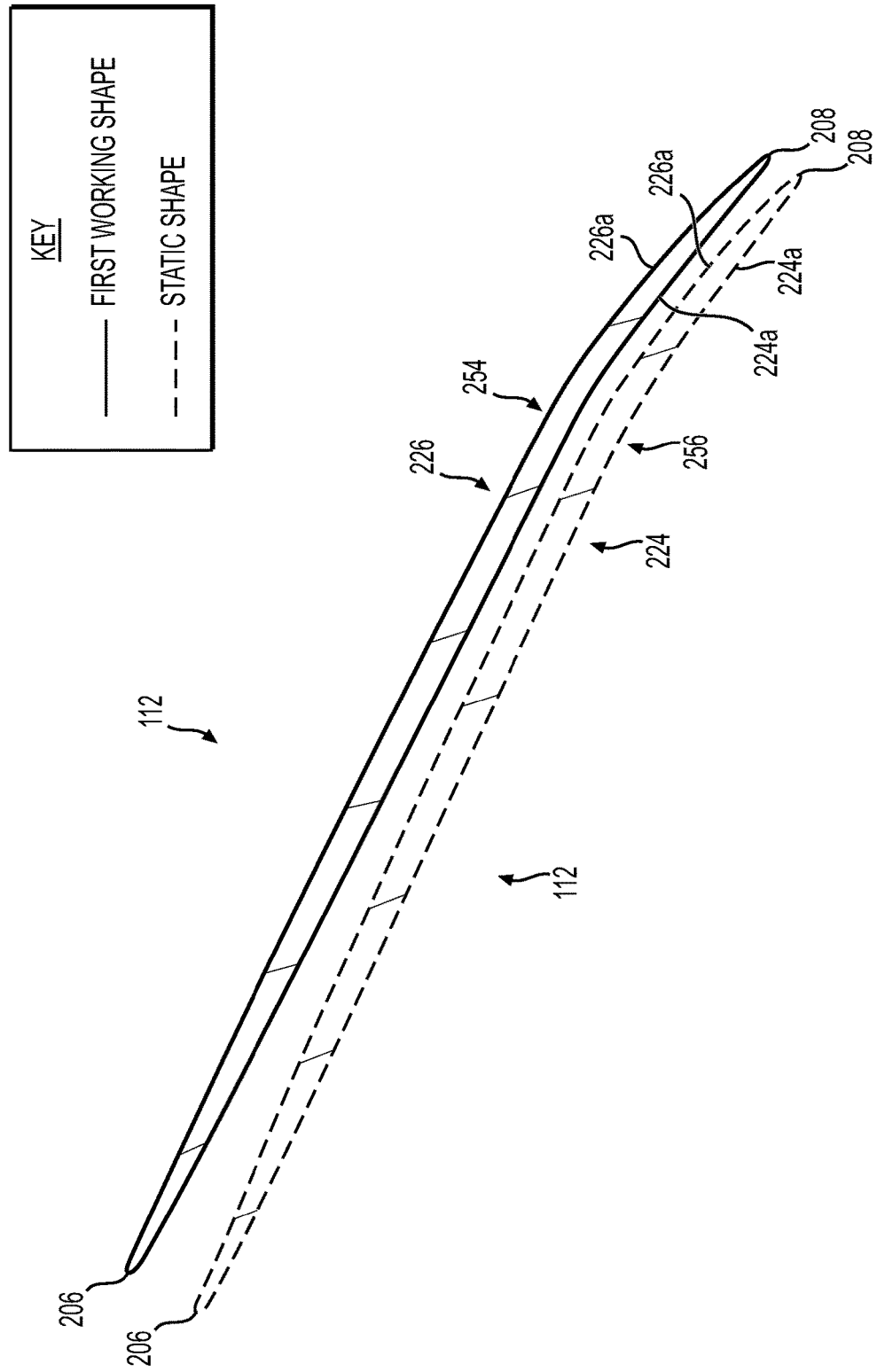
FIG. 11 is an overlay of a cross-section of the first working shape of the first airfoil in the first operating state of the mistuned rotor and a cross-section of the static shape of the first airfoil in the second operating state of the mistuned rotor between about 80% span and about 100% span taken from the perspective of line 6-6 of FIG. 4.

With reference to FIG. 10, FIG. 10 is a cross-sectional view in which a cross-section 250 of the airfoil 112 at 20% span in the first operating state is overlaid onto a cross-section 252 of the airfoil 112 at 20% span in the static state. As shown, the airfoil 112 has a static shape in the static state that is different than the second working shape of the airfoil 112 in the first operating state of the rotor 102. Generally, as the cross-sections are at 20% span, the deflection of the airfoil 112 in the first operating state is constrained by the attachment of the airfoil 112 at 0% span to the rotor disk 200. With reference to FIG. 11, FIG. 11 is a cross-sectional view in which a cross-section 254 of the airfoil 112 at 80% span in the first operating state is overlaid onto a cross-section 256 of the airfoil 112 at 80% span in the static state. As shown, the airfoil 112 has a static shape in the static state that is different than the first working shape of the airfoil 112 in the first operating state of the rotor 102.

Figure 12:
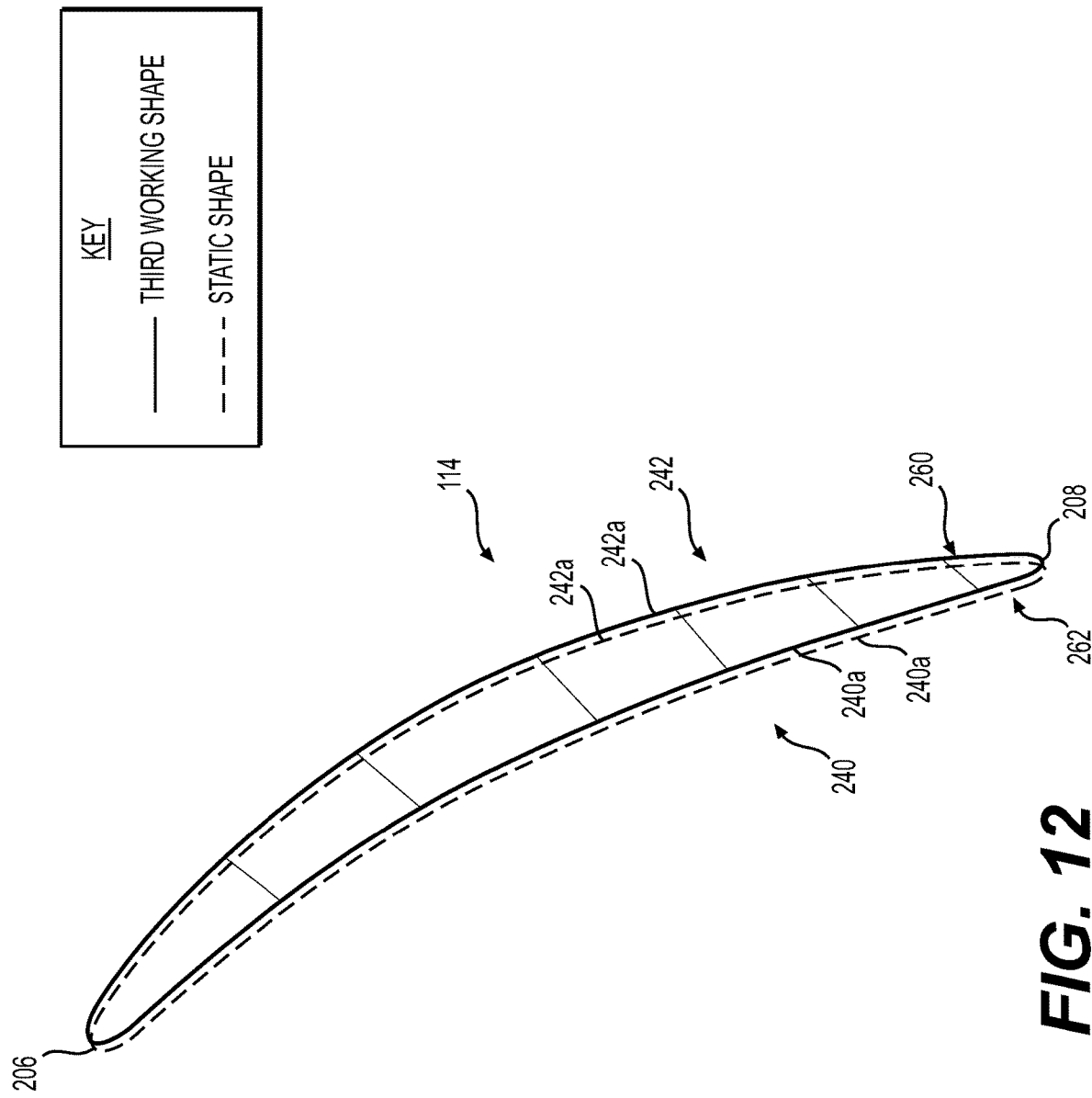
FIG. 12 is an overlay of a cross-section of the third working shape of the second airfoil in the first operating state of the mistuned rotor and a cross-section of the static shape of the second airfoil in the second operating state of the mistuned rotor between about 0% span and about 50% span taken from the perspective of line 7-7 of FIG. 4.
Figure 13:
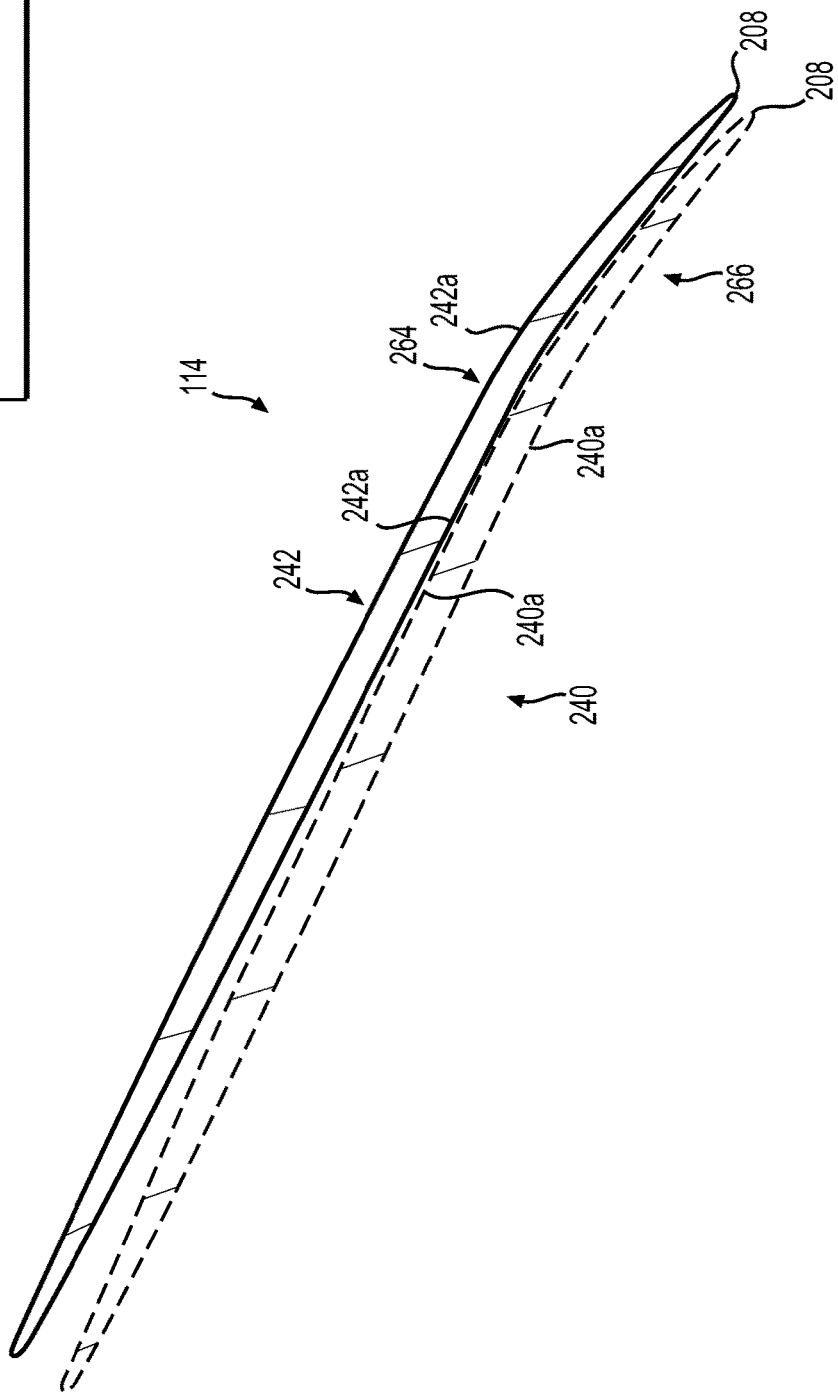
FIG. 13 is an overlay of a cross-section of the first working shape of the second airfoil in the first operating state of the mistuned rotor and a cross-section of the static shape of the second airfoil in the second operating state of the mistuned rotor between about 80% span and about 100% span taken from the perspective of line 6-6 of FIG. 4.

With reference to FIG. 12, FIG. 12 is a cross-sectional view in which a cross-section 260 of the airfoil 114 at 20% span in the first operating state is overlaid onto a cross-section 262 of the airfoil 114 at 20% span in the static state. As shown, the airfoil 114 has a static shape in the static state that is different than the second working shape of the airfoil 114 in the first operating state of the rotor 102. Generally, as the cross-sections are at 20% span, the deflection of the airfoil 114 in the first operating state is constrained by the attachment of the airfoil 114 at 0% span to the rotor disk 200. With reference to FIG. 13, FIG. 13 is a cross-sectional view in which a cross-section 264 of the airfoil 114 at 80% span in the first operating state is overlaid onto a cross-section 266 of the airfoil 114 at 80% span in the static state. As shown, the airfoil 114 has a static shape in the static state that is different than the first working shape of the airfoil 114 in the first operating state of the rotor 102.

With the rotor 102 formed with the airfoils 112, 114 arranged in an alternating pattern about the circumference of the rotor disk 200, the rotor 102 is installed in the gas turbine engine 104 (FIG. 2). In general, the rotor 102 may be incorporated into one or more of the engine sections described with regard to FIG. 2 above. For example and additionally referring to FIG. 2, the rotor 102 may be incorporated into the fan section 120 such that, as the rotor 102 rotates, the airfoils 112, 114 function to draw air into the gas turbine engine 104 with reduced susceptibility to flutter. Further, the rotor 102 may be incorporated into the compressor section 122 such that, as the rotor 102 rotates, the airfoils 112, 114 function to compress the air flowing through the airfoils 112, 114 with reduced susceptibility to flutter.

With reference back to FIG. 1, the rotor manufacturing system 100 is used to manufacture or machine the airfoils 112, 114. The manufacturing system 106 is any system or device that is capable of creating, manufacturing or machining the airfoils 112, 114 of the rotor 102. In one example, the manufacturing system 106 manufacture or machines the airfoils 112, 114 based on one or more instructions received from the controller 110. It should be noted that the manufacturing system 106 machines both the pressure side surface and the opposite suction side surface associated with each of the airfoils 112, 114 such that upon completion of the machining the airfoil 112, 114 is formed for use in the rotor 102. In one example, the manufacturing system 106 includes, but is not limited to, a computer numeric control (CNC) machine, a three dimensional metal printing machine, a direct metal laser sintering machine, an electrochemical machining machine, a powder metallurgy machine, a composite ply lay-up machine or other composite manufacturing machines to list but a few examples. The manufacturing system 106 generally machines each of the airfoils 112, 114 of a respective rotor disk out of a metal, metal alloy or polymer-based material, such as a composite. In this example, the manufacturing system 106 includes a manufacturing controller 270, which is in communication with the controller 110 via a suitable communication architecture, such as a bus. The manufacturing controller 270 includes at least one manufacturing processor 272 and a manufacturing computer readable storage device or media 274. The manufacturing processor 272 can be any custom made or commercially available processor, a central processing unit (CPU), a graphics processing unit (GPU), an auxiliary processor among several processors associated with the manufacturing controller 270, a semiconductor based microprocessor (in the form of a microchip or chip set), a macroprocessor, any combination thereof, or generally any device for executing instructions. The manufacturing computer readable storage device or media 274 may include volatile and nonvolatile storage in read-only memory (ROM), random-access memory (RAM), and keep-alive memory (KAM), for example. KAM is a persistent or non-volatile memory that may be used to store various operating variables while the manufacturing processor 272 is powered down. The computer-readable storage device or media 274 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the manufacturing controller 270 in controlling components associated with the manufacturing system 106.

The instructions may include one or more separate programs, each of which comprises an ordered listing of executable instructions for implementing logical functions. The instructions, when executed by the manufacturing processor 272, receive and process input signals, perform logic, calculations, methods and/or algorithms for controlling the components of the manufacturing system 106, and generate control signals to the components of the manufacturing system 106, including, but not limited to, a cutting tool associated with the manufacturing system 106 to form or machine the airfoils 112, 114 based on the logic, calculations, methods, and/or algorithms. Although only one manufacturing controller 270 is shown in FIG. 1, embodiments of the manufacturing system 106 can include any number of manufacturing controllers 270 that communicate over any suitable communication medium or a combination of communication mediums and that cooperate to process the sensor signals, perform logic, calculations, methods, and/or algorithms, and generate control signals to control features of the manufacturing system 106. Generally, the manufacturing controller 270 executes the instructions to machine the airfoils 112, 114 based on data received from the controller 110.

The human-machine interface 108 is in communication with the controller 110 via a suitable communication medium, such as a bus. The human-machine interface 108 may be configured in a variety of ways. In some embodiments, the human-machine interface 108 may include various switches, one or more buttons, a touchscreen interface 278 that may be overlaid on a display 280, a keyboard, an audible device, a microphone associated with a speech recognition system, or various other human-machine interface devices. In one example, the touchscreen interface 278 may receive input from the user, such as operating criteria data for the rotor 102. The touchscreen interface 278 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt input from the user, the human-machine interface 108 transmits a signal to the controller 110. As will be discussed, the controller 110 processes the signal, and determines the operating criteria data based on the user's interaction with the human-machine interface 108.

The display 280 comprises any suitable technology for displaying information, including, but not limited to, a liquid crystal display (LCD), organic light emitting diode (OLED), plasma, or a cathode ray tube (CRT). In this example, the display 280 is an electronic display capable of graphically displaying one or more user interfaces under the control of the controller 110. Those skilled in the art may realize other techniques to implement the display 280 in the rotor manufacturing system 100.

It should be noted that the human-machine interface 108 and the controller 110 may be associated with a personal computing device, including, but not limited to a desktop computer, laptop computer, tablet, portable electronic device, etc. Moreover, it should be noted that while the controller 110 and the human-machine interface 108 are described and illustrated herein as being discrete from the manufacturing system 106, the manufacturing system 106 may include the controller 110 such that in certain embodiments, the rotor manufacturing system 100 may include the manufacturing system 106 having the controller 110 and the manufacturing controller 270.

The controller 110 includes at least one processor 282 and a computer readable storage device or media 284. The processor 282 can be any custom made or commercially available processor, a central processing unit (CPU), a graphics processing unit (GPU), an auxiliary processor among several processors associated with the controller 110, a semiconductor based microprocessor (in the form of a microchip or chip set), a macroprocessor, any combination thereof, or generally any device for executing instructions. The computer readable storage device or media 284 may include volatile and nonvolatile storage in read-only memory (ROM), random-access memory (RAM), and keep-alive memory (KAM), for example. KAM is a persistent or non-volatile memory that may be used to store various operating variables while the processor 282 is powered down. The computer-readable storage device or media 284 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 110 in controlling components associated with the rotor manufacturing system 100.

The instructions may include one or more separate programs, each of which comprises an ordered listing of executable instructions for implementing logical functions. The instructions, when executed by the processor 282, receive and process input signals, perform logic, calculations, methods and/or algorithms for controlling the components of the rotor manufacturing system 100, and generate control signals to components of the rotor manufacturing system 100 to manufacture the airfoils 112, 114 based on the logic, calculations, methods, and/or algorithms. Although only one controller 110 is shown in FIG. 1, embodiments of the rotor manufacturing system 100 can include any number of controllers 110 that communicate over any suitable communication medium or a combination of communication mediums and that cooperate to process the sensor signals, perform logic, calculations, methods, and/or algorithms, and generate control signals to control features of the rotor manufacturing system 100.

In various embodiments, one or more instructions of the controller 110 are associated with the rotor manufacturing system 100 and, when executed by the processor 282, the instructions receive and process signals from the human-machine interface 108 and receive input data regarding the operating criteria for the rotor 102. In various embodiments, the instructions of the controller 110, when executed by the processor 282, determine whether to intentionally mistune the airfoils 112, 114 associated with the rotor 102, determines the working shapes of the airfoils 112, 114 and outputs static shape instruction data to the manufacturing controller 270 to manufacture the airfoils 112, 114 based on these determinations. In various embodiments, the instructions of the controller 110, when executed by the processor 282, also outputs a user interface for display on the display 280 based on the determined static shape for the airfoils 112, 114.

Figure 14:
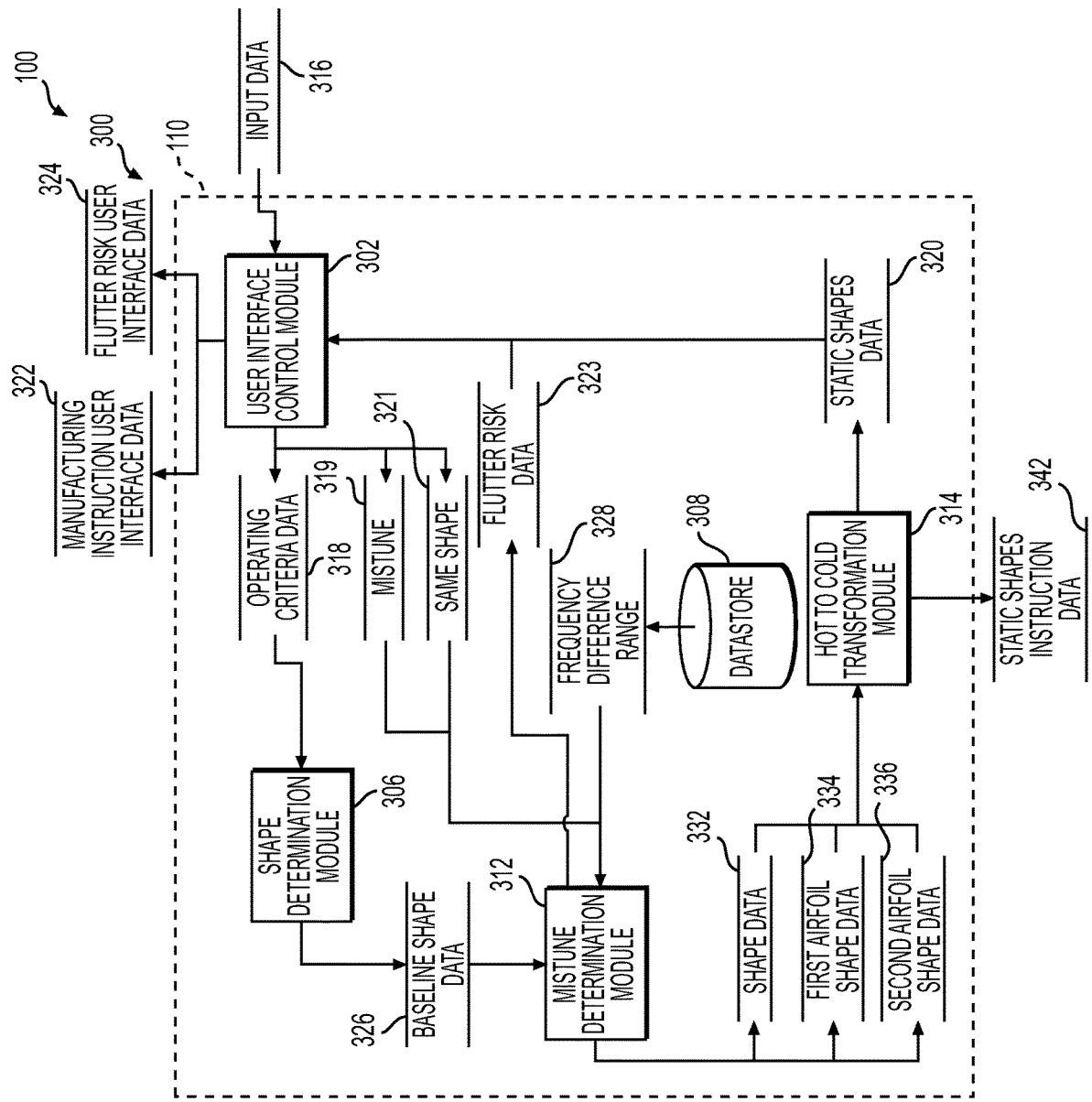
FIG. 14 is a dataflow diagram illustrating an airfoil manufacturing system of the rotor manufacturing system of FIG. 1, in accordance with various embodiments.

For example, as shown in more detail with regard to FIG. 14, and with continued reference to FIG. 1, a dataflow diagram illustrates various embodiments of an airfoil manufacturing system 300 of the rotor manufacturing system 100, which may be embedded within the controller 110. Various embodiments of the airfoil manufacturing system 300 according to the present disclosure can include any number of sub-modules embedded within the controller 110. As can be appreciated, the sub-modules shown in FIG. 14 may be combined and/or further partitioned to similarly receive data from the human-machine interface 108, and output data and one or more user interfaces. Inputs to the airfoil manufacturing system 300 may be received from the human-machine interface 108 (FIG. 1), received from other control modules (not shown) associated with the rotor manufacturing system 100, and/or determined/modeled by other sub-modules (not shown) within the controller 110. In various embodiments, with reference to FIG. 14, the airfoil manufacturing system 300 includes a user interface (UI) control module 302, a shape determination module 306, a datastore 308, a mistune determination module 312 and a hot to cold transformation module 314.

The UI control module 302 receives input data 316. The input data 316 is received from the human-machine interface 108 via the user's interaction with the human-machine interface 108, for example, the user's interaction with the touchscreen interface 278. The UI control module 302 processes the input data 316, and based on the input data 316, the UI control module 302 sets operating criteria data 318 for the shape determination module 306. The operating criteria data 318 is one or more defined or known operating characteristics for the rotor 102 that are entered as input by the user via the human-machine interface 108. In one example, the operating criteria data 318 includes, but is not limited to, a flow capacity for the rotor 102, a pressure rise for the rotor 102, air flow rate, rotational speed, volumetric constraints, fatigue life, durability requirements (foreign object damage such as ice, and birds), operating environment, etc.

The UI control module 302 also processes the input data 316, and based on the input data 316, the UI control module 302 sets mistune 319 or same shape 321 for the mistune determination module 312. The mistune 319 is a command to manufacture the airfoils 112, 114 associated with the rotor 102 such that one or more of the airfoils 112, 114 has a different shape and a different natural vibratory frequency. The same shape 321 is a command to manufacture the airfoils 112, 114 associated with the rotor 102 such that the airfoils 112, 114 have the same shape.

The UI control module 302 also receives as input static shapes data 320 from the hot to cold transformation module 314. The static shapes data 320 is data that indicates the static shapes for the airfoils 112, 114 in the second operating condition of the rotor 102. Based on the static shapes data 320, the UI control module 302 generates and outputs manufacturing instruction user interface data 322 for rendering a user interface including the static shapes data 320 on the display 280. In one example, the manufacturing instruction user interface data 322 comprises data for rendering the user interface including the static shapes data 320 in a graphical format, such as a three-dimensional image, on the display 280. The manufacturing instruction user interface data 322 may also comprise data for rendering the user interface including the static shapes data 320 in a graphical format, such as part drawing, on the display 280. The user interface rendered based on the manufacturing instruction user interface data 322 is displayed on the display 280 by the controller 110 to inform the user of the static shapes data 320 for the airfoils 112, 114.

The UI control module 302 also receives as input flutter risk data 323 from the mistune determination module 312. The flutter risk data 323 is data that indicates a risk of flutter associated with the airfoils 112, 114 in the first operating condition of the rotor 102. Based on the flutter risk data 323, the UI control module 302 generates and outputs flutter risk user interface data 324 for rendering a user interface including the flutter risk data 323 on the display 280. In one example, the flutter risk user interface data 324 comprises data for rendering the user interface including the flutter risk data 323 in a graphical format, such as a graph of a flutter boundary, on the display 280. The flutter risk user interface data 324 may also comprise data for rendering the user interface including the flutter risk data 323 in a textual format or tabular format on the display 280. The user interface rendered based on the flutter risk user interface data 324 is displayed on the display 280 by the controller 110 to inform the user of flutter risk for the airfoils 112, 114.

The shape determination module 306 receives as input the operating criteria data 318 from the UI control module 302. The shapes determination module 306 performs a series of physics-based assessments based on the operating criteria data 318 to determine a baseline working shape or baseline shape data 326 for each of the airfoils 112, 114 in the first operating state of the rotor 102. The physics-based assessments may include computational fluid analysis, etc. as known to one skilled in the art to determine the baseline shape data 326. The baseline shape data 326 is the baseline working shape geometry for the airfoils 112, 114 of the rotor 102, which is determined based on the operating criteria of the rotor 102. The shapes determination module 306 sets the baseline shape data 326 for each of the airfoils 112, 114 for the mistune determination module 312.

The datastore 308 stores data of a natural vibratory frequency difference range between the airfoils 112, 114. In one example, the datastore 308 stores a frequency difference range 328, which is a known, predefined or factory-set range for a frequency difference between directly adjacent ones of the airfoils 112, 114. In this example, the frequency difference range 328 is about 3% to about 15%.

The mistune determination module 312 receives as input the baseline shape data 326. Based on the baseline shape data 326, the mistune determination module 312 determines the flutter boundary for the rotor 102. In one example, the mistune determination module 312 determines the flutter boundary in the first operating state of the rotor 102 based on high fidelity unsteady aero-elastic analysis of the operation of the rotor 102 in the first operating state and the natural vibratory frequency of the airfoils 112, 114 with the same baseline shape geometry. The predicted flutter boundary is the flutter risk associated with the airfoils 112, 114 of the rotor 102 in the first operating condition of the rotor 102. The mistune determination module 312 sets the determined flutter boundary as the flutter risk data 323 for the UI control module 302.

The mistune determination module 312 receives as input the mistune 319 from the UI control module 302. Based on the mistune 319, for each airfoil 112, 114 of the rotor 102, the mistune determination module 312 determines a first working shape for each of the airfoils 112, 114 in the first operating state of the rotor 102. In one example, the first working shape is based on the baseline shape data 326, and may comprise the baseline shape data 326 which is unmodified. In this example, the first working shape for each of the airfoils 112, 114 is the same suction side surface shape and the same pressure side surface shape between 10% and 90% of the chord and between 80% and 100% of the span. The mistune determination module 312 determines a second working shape for the airfoil 112, which is different than a third working shape for the airfoil 114. The second working shape modifies the baseline shape data 326 to reduce a thickness of the airfoil 112 between 0% and 50% of the span, which results in a corresponding shape change in the pressure side surface 224a (FIG. 7). In one example, the mistune determination module 312 determines to modify the baseline shape data 326 to reduce the maximum thickness of the airfoil 112 by modifying the pressure side surface 224a (FIG. 7) by about 10% to about 30% to change the natural vibratory frequency of the airfoil 112. The third working shape is based on the baseline shape data 326, and may comprise the baseline shape data 326 which is unmodified.

The mistune determination module 312 determines, based on the first working shape and the second working shape, a natural vibratory frequency for the airfoils 112. The mistune determination module 312 determines, based on the first working shape and the third working shape, the natural vibratory frequency for the airfoils 114. In one example, the mistune determination module 312 determines the natural vibratory frequency of the airfoils 112, 114 using computational fluid dynamics analysis. The mistune determination module 312 determines the frequency difference between adjacent ones of the airfoils 112, 114 based on the determined natural vibratory frequencies. The mistune determination module 312 queries the datastore 308 and retrieves the frequency difference range 328. The mistune determination module 312 compares the frequency difference between adjacent ones of the airfoils 112, 114 to the frequency difference range 328. Based on the comparison, if the frequency difference between adjacent ones of the airfoils 112, 114 is within the range provided by the frequency difference range 328, the mistune determination module 312 processes the first working shape, the second working shape and the remainder of the baseline shape geometry of the airfoil 112 (from the baseline shape data 326) to ensure the baseline shape geometry of the airfoil 112 meets other design criteria for the rotor 102 and the airfoil 112, including, but not limited to, a flow capacity of the rotor 102, a pressure rise of the rotor 102, geometric constraints including length and diameter of the rotor 102, a flutter and stability margin for the rotor 102, and durability requirements for the rotor 102 and the airfoil 112, including foreign object debris tolerance. In one example, the mistune determination module 312 uses computational fluid dynamics analysis to process the geometry of the airfoil 112 for compliance with the other requirements. Once complete, the mistune determination module 312 sets the first working shape, the second working shape and the remainder of the baseline shape geometry of the airfoil 112 (from the baseline shape data 326), as modified for the other design requirements, as applicable, as first airfoil shape data 334 for the hot to cold transformation module 314. Thus, the first airfoil shape data 334 is complete shape geometry for the airfoil 112 (pressure and suction side surfaces) in the first operating state of the rotor 102, which includes the thickness modifications between about 0% to 50% span and about 10% to about 90% of the chord of the airfoil 112 on the pressure side surface 224a (FIG. 7) to result in a different natural vibratory frequency for the airfoil 112.

Based on the comparison, if the frequency difference between adjacent ones of the airfoils 112, 114 is within the range provided by the frequency difference range 328, the mistune determination module 312 processes the first working shape, the third working shape and the remainder of the baseline shape geometry of the airfoil 114 (from the baseline shape data 326) to ensure the baseline shape geometry of the airfoil 114 meets other design criteria for the rotor 102 and the airfoil 114, including, but not limited to, a flow capacity of the rotor 102, a pressure rise of the rotor 102, geometric constraints including length and diameter of the rotor 102, a flutter and stability margin for the rotor 102, and durability requirements for the rotor 102 and the airfoil 114, including foreign object debris tolerance. In one example, the mistune determination module 312 uses computational fluid dynamics analysis to process the geometry of the airfoil 114 for compliance with the other requirements. Once complete, the mistune determination module 312 sets the first working shape, the third working shape and the remainder of the baseline shape geometry of the airfoil 114 (from the baseline shape data 326), as modified for the other design requirements, as applicable, as second airfoil shape data 336 for the hot to cold transformation module 314. Thus, the second airfoil shape data 336 is complete shape geometry for the airfoil 114 (pressure and suction side surfaces) in the first operating state of the rotor 102.

Based on the comparison, if the frequency difference between adjacent ones of the airfoils 112, 114 is outside of the range provided by the frequency difference range 328, the mistune determination module 312 repeats the process of determining a second working shape for the airfoil 112, the determining of the natural vibratory frequency for the airfoils 112, 114 and the comparison to arrive at a second working shape that creates a natural vibratory frequency difference that is within the frequency difference range 328. In other embodiments, the mistune determination module 312 may set an error message for the UI control module 302, and the UI control module 302 may output error user interface data for rendering an error user interface on the display 280 (FIG. 1), which indicates an error in determining the second working shape for the airfoils 112.

The mistune determination module 312 receives as input the same shape 321 from the UI control module 302. Based on the same shape 321, for each airfoil 112, 114 of the rotor 102, the mistune determination module 312 processes the baseline shape data 326 to ensure the baseline shape geometry of the airfoils 112, 114 meets other design criteria for the rotor 102 and the airfoils 112, 114, including, but not limited to, a flow capacity of the rotor 102, a pressure rise of the rotor 102, geometric constraints including length and diameter of the rotor 102, a flutter and stability margin for the rotor 102, and durability requirements for the rotor 102 and the airfoils 112, 114, including foreign object debris tolerance. In one example, the mistune determination module 312 uses computational fluid dynamics analysis to process the baseline shape data 326 for compliance with the other requirements. Once complete, the mistune determination module 312 sets the baseline shape data 326, as modified for the other requirements, as applicable, as shape data 332 for the hot to cold transformation module 314. The shape data 332 is the same shape (pressure and suction side surfaces) for each of the airfoils 112, 114.

The hot to cold transformation module 314 receives as input the shape data 332, which provides the same shape for the airfoils 112, 114 in the first operating state of the rotor 102. Based on the shape data 332, performs a hot to cold geometry transformation to generate static shapes for the airfoils 112, 114 in the second operating condition of the rotor 102. In one example, the hot to cold transformation module 314 performs the hot to cold geometry transformation with a finite element solver that assesses the impact of rotational speed, thermal changes, pressure load changes and contact force changes to determine the static shape for the airfoils 112, 114. The hot to cold transformation module 314 sets the generated static shapes for the airfoils 112, 114 as the static shapes data 320. The hot to cold transformation module 314 also outputs the generated static shapes as static shapes instruction data 342 for the manufacturing controller 270 of the manufacturing system 106. The static shapes instruction data 342 is instruction data for the manufacturing system 106 to manufacture or machine the airfoils 112, 114 based on the geometry of the static shapes generated by the hot to cold geometry transformation. In one example, the manufacturing controller 270, based on the static shapes instruction data 342, generates and outputs one or more control signals for controlling the manufacturing system 106 to manufacture the airfoils 112, 114. For example, the manufacturing controller 270 generates and outputs the one or more control signals to a cutting tool associated with the manufacturing system 106 to control the cutting tool to manufacture or machine the airfoils 112, 114.

The hot to cold transformation module 314 also receives as input the first airfoil shape data 334, which provides the shape for the intentionally mistuned airfoils 112 in the first operating state of the rotor 102. Based on the first airfoil shape data 334, the hot to cold transformation module 314 performs a hot to cold geometry transformation to generate static shapes for the airfoils 112 in the second operating condition of the rotor 102. The hot to cold transformation module 314 also receives as input the second airfoil shape data 336, which provides the shape for the airfoils 114 in the first operating state of the rotor 102. Based on the second airfoil shape data 336, the hot to cold transformation module 314 performs a hot to cold geometry transformation to generate static shapes for the airfoils 114 in the second operating condition of the rotor 102. The hot to cold transformation module 314 sets the generated static shapes for the airfoils 112, 114 as the static shapes data 320. The hot to cold transformation module 314 also outputs the generated static shapes as static shapes instruction data 342 for the manufacturing controller 270 of the manufacturing system 106. In one example, the manufacturing controller 270, based on the static shapes instruction data 342, generates and outputs one or more control signals for controlling the manufacturing system 106 to manufacture the airfoils 112, 114. For example, the manufacturing controller 270 generates and outputs the one or more control signals to a cutting tool associated with the manufacturing system 106 to control the cutting tool to manufacture or machine the airfoils 112, 114.

Figure 15:
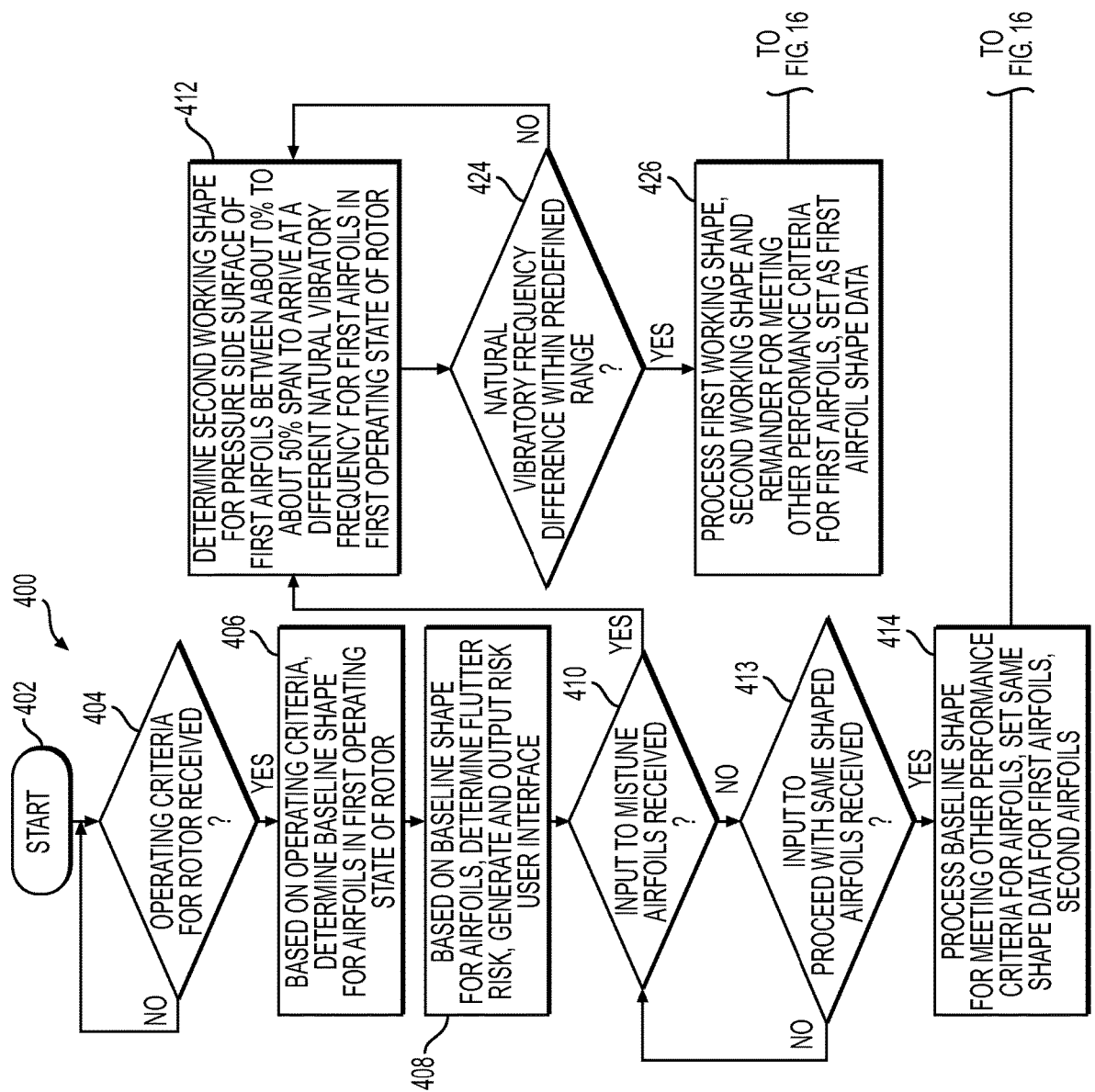
FIG. 15 is a flowchart illustrating a control method for the airfoil manufacturing system of the rotor manufacturing system of FIG. 1, in accordance with various embodiments.
Figure 16:
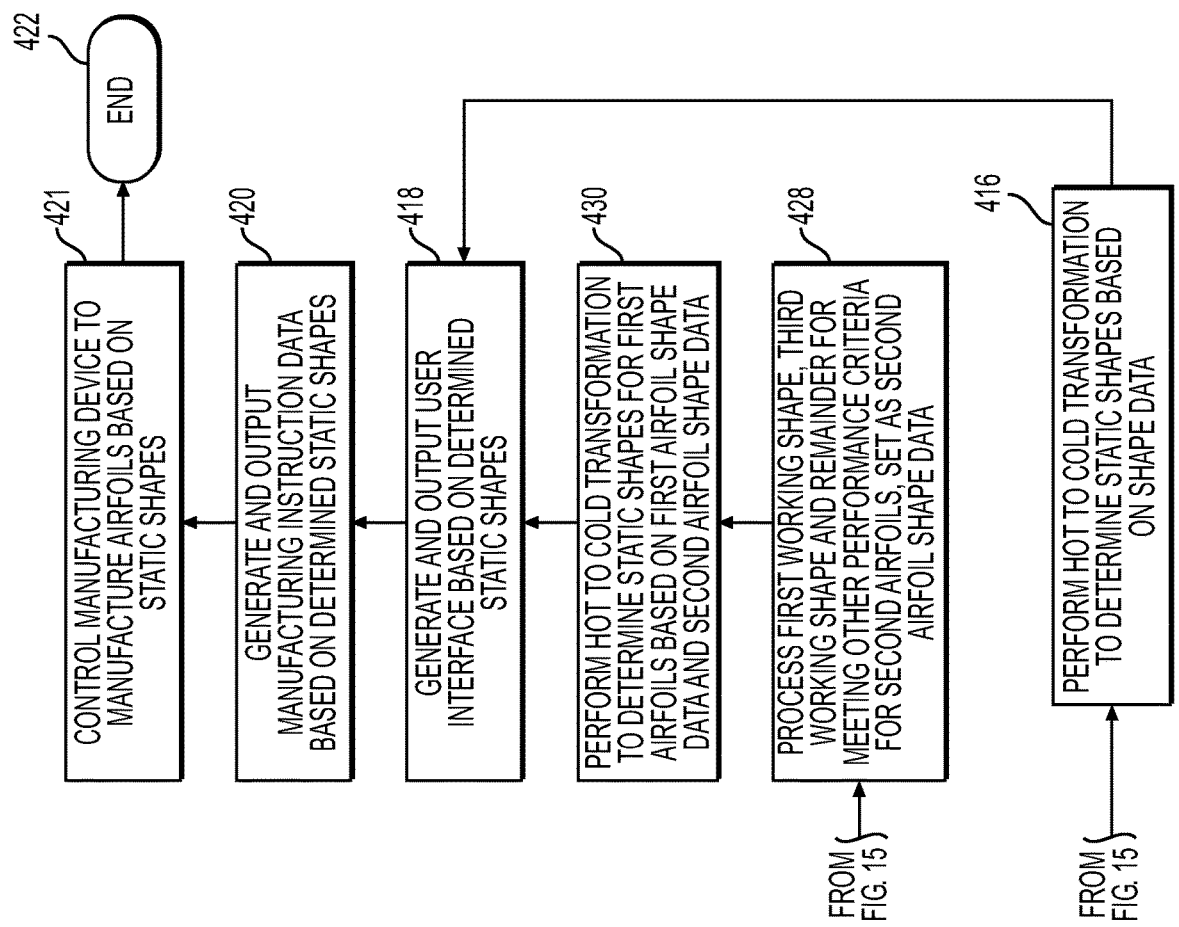
FIG. 16 is a continuation of the flowchart of FIG. 15.

Referring now to FIGS. 15 and 16, and with continued reference to FIGS. 1-4A and 14, a flowchart illustrates a control method 400 that can be performed by the airfoil manufacturing system 300 of FIG. 14 of the rotor manufacturing system 100 in accordance with the present disclosure. In various embodiments, the control method 400 is performed by the processor 282 of the controller 110. As can be appreciated in light of the disclosure, the order of operation within the method is not limited to the sequential execution as illustrated in FIGS. 15 and 16, but may be performed in one or more varying orders as applicable and in accordance with the present disclosure. In various embodiments, the control method 400 can be scheduled to run based on one or more predetermined events, such as based on the receipt of the input data 316.

The method begins at 402. At 404, the method determines whether the operating criteria for the rotor 102 (i.e. the operating criteria data 318) has been received from the user's interaction with the human-machine interface 108. If true, the method proceeds to 306. Otherwise, the method loops.

At 406, based on the operating criteria for the rotor 102, the method determines the baseline shape data 326 for the airfoils 112, 114 in the first operating state of the rotor 102 by performing the series of physics-based assessments based on the operating criteria data 318. At 408, the method determines, based on the baseline shape data 326, the flutter risk for the airfoils 112, 114 in the first operating state of the rotor 102. In one example, the method determines the flutter boundary in the first operating state of the rotor 102 based on high fidelity unsteady aero-elastic analysis of the operation of the rotor 102 in the first operating state and the natural vibratory frequency of the airfoils 112, 114 with the same baseline working shape geometry. The predicted flutter boundary is the flutter risk associated with the airfoils 112, 114 of the rotor 102 in the first operating condition of the rotor 102. The method generates and outputs the flutter risk user interface data 324 for rendering the user interface on the display 280 that indicates the flutter risk associated with the airfoils 112, 114 having the same shape in the first operating state of the rotor 102. The method includes displaying the user interface rendered based on the flutter risk user interface data 324 on the display 280 to inform the user of flutter risk for the airfoils 112, 114.

At 410, the method determines whether input data 316 has been received to mistune the airfoils 112, 114 (i.e. the mistune 319), based on the user's review of the flutter risk user interface data 324 rendered on the display 280, for example. If true, the method proceeds to 412. Otherwise, at 413, the method determines whether input data 316 has been received to maintain the same shape for the airfoils 112, 114 (i.e. the same shape 321), based on the user's review of the flutter risk user interface data 324 rendered on the display 280, for example. If false, the method loops to 410.

Otherwise, if the same shape 321 has been received at 412, the method, at 414 processes the baseline shape data 326 for compliance with the other requirements, using computational fluid dynamics analysis, for example. The method sets shape data 332, as modified for the other design requirements, as applicable, which provides the same shape for the airfoils 112, 114. With reference to FIG. 16, at 416, the method performs the hot to cold geometry transformation based on the shape data 332 to generate the static shapes for the airfoils 112, 114 in the second operating condition of the rotor 102. At 418, the method generates manufacturing instruction user interface data 322 for rendering a user interface on the display 280 based on the generated static shapes. The method includes displaying the user interface rendered based on the manufacturing instruction user interface data 322 on the display 280 to inform the user of the static shapes data 320 for the airfoils 112, 114. At 420, the method generates and outputs the static shapes instruction data 342 for the manufacturing controller 270 of the manufacturing system 106, which includes instructions for the manufacture of the airfoils 112, 114 based on the geometry of the generated static shapes. At 421, the method, via the manufacturing controller 270 of the manufacturing system 106, controls the manufacturing system 106, via control of a cutting tool associated with the manufacturing system 106, for example, to manufacture the airfoils 112, 114 based on the static shapes. In one example, the manufacturing controller 270, based on the static shapes instruction data 342 generates and outputs one or more control signals for controlling the manufacturing system 106 to manufacture the airfoils 112, 114. The method ends at 422.

At 412, based on the receipt of the mistune 319, the method determines the second working shape for the airfoils 112 between about 0% to about 50% span to arrive at a different natural vibratory frequency than the airfoils 114 in the first operating state of the rotor 102. In one example, the method determines to modify the baseline shape data 326 to reduce the maximum thickness of the airfoil 112 by modifying the pressure side surface 224a (FIG. 7) by about 10% to about 30% to change the natural vibratory frequency of the airfoil 112. The method also determines the first working shape for each of the airfoils 112, 114 that has the same suction side surface shape and the same pressure side surface shape between 10% and 90% of the chord and between 80% and 100% of the span in the first operating state. The method also determines the third working shape for the airfoil 114, which may comprise the unmodified baseline shape data 326.

At 424, the method determines whether the natural vibratory frequency between the airfoils 112, 114 is within the predefined frequency difference range 328. In one example, the method determines, based on the first working shape, the second working shape and the remainder of the baseline shape geometry of the airfoil 112 (from the baseline shape data 326), the natural vibratory frequency for the airfoils 112. The method determines, based on the first working shape, the third working shape and the remainder of the baseline shape geometry of the airfoil 114 (from the baseline shape data 326), the natural vibratory frequency for the airfoils 114. The method determines the frequency difference between adjacent ones of the airfoils 112, 114 based on the determined natural vibratory frequencies. The method compares the frequency difference between adjacent ones of the airfoils 112, 114 to the frequency difference range 328. Based on the comparison, if the frequency difference between adjacent ones of the airfoils 112, 114 is within the range provided by the frequency difference range 328, the method proceeds to 426. Otherwise, the method loops to 412.

At 426, the method processes the first working shape, the second working shape and the remainder of the baseline shape geometry of the airfoil 112 (from the baseline shape data 326) to ensure the baseline shape geometry of the airfoil 112 meets other design criteria for the rotor 102 and the airfoil 112, including, but not limited to, a flow capacity of the rotor 102, a pressure rise of the rotor 102, geometric constraints including length and diameter of the rotor 102, a flutter and stability margin for the rotor 102, and durability requirements for the rotor 102 and the airfoil 112, including foreign object debris tolerance. Once complete, the method sets the first working shape, the second working shape and the remainder of the baseline shape geometry of the airfoil 112 (from the baseline shape data 326), as modified for the other design requirements, as applicable, as the first airfoil shape data 334.

With reference to FIG. 16, at 428, the method processes the first working shape, the third working shape and the remainder of the baseline shape geometry of the airfoil 114 (from the baseline shape data 326) to ensure the baseline shape geometry of the airfoil 114 meets other design criteria for the rotor 102 and the airfoil 114, including, but not limited to, a flow capacity of the rotor 102, a pressure rise of the rotor 102, geometric constraints including length and diameter of the rotor 102, a flutter and stability margin for the rotor 102, and durability requirements for the rotor 102 and the airfoil 114, including foreign object debris tolerance. Once complete, the method sets the first working shape, the third working shape and the remainder of the baseline shape geometry of the airfoil 114 (from the baseline shape data 326), as modified for the other design requirements, as applicable, as the second airfoil shape data 336.

At 430, the method performs the hot to cold geometry transformation based on the first airfoil shape data 334 to generate the static shapes for the airfoils 112 in the second operating condition of the rotor 102. The method performs the hot to cold geometry transformation based on the second airfoil shape data 336 to generate the static shapes for the airfoils 114 in the second operating condition of the rotor 102. The method proceeds to 418.

Thus, the airfoil manufacturing system 300 of the rotor manufacturing system 100 generates and machines the airfoils 112, 114 based on a working shape of the airfoils 112, 114 at a hot or the first operating state of rotor 102 to reduce acoustic noise generation while reducing susceptibility to flutter. In this regard, by determining the natural vibratory frequency of the airfoils 112, 114 in the first operating state of the rotor 102, and mistuning the airfoils 112, 114 based on the shape of the airfoils 112, 114 in the first operating state, the airfoils 112, 114 are mistuned while reducing acoustic energy generation. In addition, by maintaining the inlet metal angles and the outlet metal angles the same and the suction side surfaces 226a, 242a the same during the first operating state of the rotor 102, aerodynamic variability between the airfoils 112, 114 is reduced, which reduces acoustic energy and the propagation of acoustic energy. Generally, the suction side surfaces 226a, 242a are the same between about 20% span and 100% span between the airfoils 112, 114 during the first operating state, and the pressure side surfaces 224a, 240a are different between about 0% span to about 50% span during the first operating state of the rotor 102. By modifying the thickness of the pressure side surface 224a below about 50% span, the mistuning of the airfoil 112 avoids passage variations in the portion of the flow passage where shockwaves may occur during the operation of the rotor 102 in the first operating state. The difference in the pressure side surface 224a at the first operating state of the rotor 102 results in the static shape (pressure and suction side surfaces) of the airfoil 112 being different than the static shape (pressure and suction side surfaces) of the airfoil 114.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A rotor for a gas turbine engine, comprising:
a plurality of airfoils each extending from a root to a tip and having a leading edge opposite a trailing edge, each airfoil of the plurality of airfoils having a span that extends from 0% at the root to 100% at the tip, a chord that extends from 0% at the leading edge to 100% at the trailing edge and a pressure side opposite a suction side, the pressure side of each airfoil of the plurality of airfoils having a pressure side surface shape based on an operating state of the rotor and the suction side of each airfoil of the plurality of airfoils having a suction side surface shape based on the operating state of the rotor;

each airfoil of the plurality of airfoils has the same suction side surface shape between 10% and 90% of the chord and between 80% and 100% of the span at a first operating state of the rotor; and at least one first airfoil of the plurality of airfoils has a different suction side surface shape between 10% and 90% of the chord and between 80% and 100% of the span than at least one second airfoil of the plurality of airfoils at a static state of the rotor.

2. The rotor of claim 1, wherein in the first operating state of the rotor, the rotor has a rotational speed in which a tip speed of the rotor is greater than 900 feet per second.

3. The rotor of claim 1, wherein each airfoil of the plurality of airfoils has the same pressure side surface shape between 10% and 90% of the chord and between 80% and 100% of the span in the first operating state of the rotor.

4. The rotor of claim 1, wherein the at least one first airfoil of the plurality of airfoils is directly adjacent to the at least one second airfoil of the plurality of airfoils.

5. The rotor of claim 1, wherein the pressure side surface shape between 0% and 50% of the span of the at least one first airfoil of the plurality of airfoils is different than the pressure side surface shape between 0% and 50% of the span of the at least one second airfoil of the plurality of airfoils at the first operating state of the rotor.

6. The rotor of claim 5, wherein the at least one first airfoil of the plurality of airfoils has at least one local thickness between 0% and 50% of the span that is different than at least one second local thickness of the at least one second airfoil of the plurality of airfoils between 0% and 50% of the span.

7. The rotor of claim 1, wherein the pressure side surface shape between 0% and 50% of the span of the at least one first airfoil of the plurality of airfoils is different than the pressure side surface between 0% and 50% of the span of the at least one second airfoil of the plurality of airfoils at the static state of the rotor.

8. A method for manufacturing a plurality of airfoils associated with a rotor for a gas turbine engine, the method comprising:

determining, by a processor, a first working shape for a suction side surface of each airfoil of the plurality of airfoils at a first operating state of the rotor, each airfoil of the plurality of airfoils including a suction side having the suction side surface opposite a pressure side having a pressure side surface, a leading edge opposite a trailing edge and extending from a root to a tip, each airfoil of the plurality of airfoils having a span that extends from 0% at the root to 100% at the tip and a chord that extends from 0% at the leading edge to 100% at the trailing edge, and the first working shape for the suction side surface is the same for each airfoil of the plurality of airfoils between 10% and 90% of the chord and 80% and 100% of the span;

determining, by the processor, a second working shape for at least one of the suction side surface and the pressure side surface of at least one first airfoil of the plurality of airfoils between 0% and 50% of the span that is different than a third working shape for at least one of the suction side surface and the pressure side surface of at least one second airfoil of the plurality of airfoils between 0% and 50% of the span at the first operating state of the rotor;

determining, by the processor, a static shape for each airfoil of the plurality of airfoils at a static state of the rotor, and the static shape is based on at least one of the first working shape, the second working shape and the third working shape; and manufacturing each airfoil of the plurality of airfoils based on the static shape.

9. The method of claim 8, further comprising:
performing a hot to cold geometry transformation, by the processor, to determine the static shape for the at least one first airfoil of the plurality of airfoils based on the first working shape and the second working shape.

10. The method of claim 8, further comprising:
performing a hot to cold geometry transformation, by the processor, to determine the static shape for the at least one second airfoil of the plurality of airfoils based on the first working shape and the third working shape.

11. The method of claim 8, further comprising:
determining, by the processor, the second working shape based on a change in a thickness of the at least one first airfoil of the plurality of airfoils between 0% span and 50% span to obtain a difference between a first natural vibratory frequency of the at least one first airfoil of the plurality of airfoils and a second natural vibratory frequency of the at least one second airfoil of the plurality of airfoils.

12. The method of claim 8, further comprising:
determining, by the processor, the second working shape for the pressure side surface of the at least one first airfoil of the plurality of airfoils, with the suction side surface of the at least one first airfoil of the plurality of airfoils the same as the suction side surface of the at least one second airfoil of the plurality of airfoils.

13. A rotor for a gas turbine engine, comprising:
a plurality of airfoils each extending from a root to a tip and having a leading edge opposite a trailing edge, each airfoil of the plurality of airfoils having a span that extends from 0% at the root to 100% at the tip, and a pressure side opposite a suction side, the pressure side of each airfoil of the plurality of airfoils having a pressure side surface shape based on an operating state of the rotor and the suction side of each airfoil of the plurality of airfoils having a suction side surface shape based on the operating state of the rotor;

each airfoil of the plurality of airfoils has the same suction side surface shape and the same pressure side surface shape between 80% and 100% of the span at a first operating state of the rotor;

at least one first airfoil of the plurality of airfoils has the pressure side surface shape between 0% and 50% of the span that is different than the pressure side surface shape between 0% and 50% of the span of at least one second airfoil of the plurality of airfoils at the first operating state of the rotor; and the at least one first airfoil of the plurality of airfoils has a different suction side surface shape between 80% and 100% of the span than the at least one second airfoil of the plurality of airfoils at a static state of the rotor.

14. The rotor of claim 13, wherein in the first operating state of the rotor, the rotor has a rotational speed in which a tip speed of the rotor is greater than 900 feet per second.

15. The rotor of claim 13, wherein the at least one first airfoil of the plurality of airfoils is directly adjacent to the at least one second airfoil of the plurality of airfoils.

16. The rotor of claim 13, wherein the at least one first airfoil of the plurality of airfoils has at least one local thickness between 0% and 50% of the span that is different than at least one second local thickness of the second airfoil of the plurality of airfoils between 0% and 50% of the span.

17. The rotor of claim 13, wherein the pressure side surface shape between 0% and 50% of the span of the at least one first airfoil of the plurality of airfoils is different than the pressure side surface between 0% and 50% of the span of the at least one second airfoil of the plurality of airfoils at the static state of the rotor.

18. The rotor of claim 13, wherein each airfoil of the plurality of airfoils has a chord that extends from 0% at the leading edge to 100% at the trailing edge, and between 80% and 100% of the span, each airfoil of the plurality of airfoils has the same suction side surface shape and the same pressure side surface shape between 10% and 90% of the chord at the first operating state of the rotor.

19. The rotor of claim 18, wherein the at least one first airfoil of the plurality of airfoils has the different suction side surface shape between 10% and 90% of the chord and between 80% and 100% of the span than the at least one second airfoil of the plurality of airfoils at the static state of the rotor.

* * * * *